US012587934B2

(12) United States Patent
Awada et al.

(10) Patent No.: US 12,587,934 B2
(45) Date of Patent: Mar. 24, 2026

(54) CONNECTION SWITCHING CONTROL MECHANISM IN MULTI CONNECTIVITY COMMUNICATION

(71) Applicant: Nokia Technologies Oy, Espoo (FI)

(72) Inventors: Ahmad Awada, Munich (DE); Srinivasan Selvaganapathy, Bangalore (IN); Amaanat Ali, Espoo (FI); Elena Virtej, Espoo (FI); Faranaz Sabouri-Sichani, Aalborg (DK); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 454 days.

(21) Appl. No.: 18/043,781

(22) PCT Filed: Aug. 18, 2021

(86) PCT No.: PCT/EP2021/072924
§ 371 (c)(1),
(2) Date: Mar. 2, 2023

(87) PCT Pub. No.: WO2022/053270
PCT Pub. Date: Mar. 17, 2022

(65) Prior Publication Data
US 2023/0319669 A1     Oct. 5, 2023

(30) Foreign Application Priority Data
Sep. 14, 2020   (IN)  ............................. 202041039825

(51) Int. Cl.
*H04W 36/30*     (2009.01)
*H04W 36/00*     (2009.01)
(Continued)

(52) U.S. Cl.
CPC ... *H04W 36/305* (2018.08); *H04W 36/00692* (2023.05); *H04W 36/0079* (2018.08); *H04W 36/08* (2013.01); *H04W 76/19* (2018.02)

(58) Field of Classification Search
CPC ....... H04W 36/00692; H04W 36/0079; H04W 36/08; H04W 36/305; H04W 76/19
See application file for complete search history.

(56) References Cited

U.S. PATENT DOCUMENTS

2019/0356536 A1* 11/2019 Lee ..................... H04L 41/0816
2020/0045764 A1   2/2020 Kim et al.
(Continued)

FOREIGN PATENT DOCUMENTS

WO     2020/025022 A1   2/2020
WO     2020/113867 A1   6/2020
(Continued)

OTHER PUBLICATIONS

Notice of Allowance received for corresponding European Patent Application No. 21762495.6, dated Jun. 11, 2024, 7 pages.
(Continued)

*Primary Examiner* — Kashif Siddiqui
(74) *Attorney, Agent, or Firm* — Lippes Mathias LLP

(57)      ABSTRACT

An apparatus for use by a communication element or function configured to conduct a multi-connectivity communication in a communication network in which at least two communication links are used to at least two different cells formed by at least one network element or function for forming a communication path, the apparatus comprising at least one processing circuitry, and at least one memory for storing instructions to be executed by the processing circuitry, wherein the at least one memory and the instructions are configured to, with the at least one processing circuitry, cause the apparatus at least: to determine that a link failure
(Continued)

UE 1 | MN1 (SOURCE PCELL) | SN1 (SOURCE PSCELL) | MN2 (TARGET PCELL) | SN2 (TARGET PSCELL)

S410: RLF DETECTED (PCELL)
S420: TIMER T316 STARTED
S430: MCG FAILURE INFORMATION
S435: MCG FAILURE INFORMATION
S440: HO REQUEST
S445: HO REQUEST ACK
S450: CPC CONDITION MET
S455: STOP TIMER T316
S460: UE DETACH FROM SOURCE PSCELL, ACCESS TO TARGET PSCELL
S465: RANDOM ACCESS PROCEDURE
S470: RRC RECONFIGURATION (HO COMMAND)
S480: RRC RECONFIGURATION (HO COMMAND)
S481: START TIMER TX
S483: MCG FAILURE INFORMATION
S485: MCG FAILURE INFORMATION
S487: RRC RECONFIGURATION (HO COMMAND)
S490: RRC RECONFIGURATION (HO COMMAND)
S492: STOP TIMER TX WHEN RECEIVING RRC RECONFIG/ RELEASE FROM SOURCE MN
S495: IF TIMER TX EXPIRES, REESTABLISHMENT recovery procedure for a first communication link with a first cell is conducted, to detect that a condition for performing a conditional cell change procedure for a second communication link to a second cell is met, which is to be conducted during the link failure recovery procedure for the first communication link, to execute a processing for controlling a timing for conducting at least one of the link failure recovery procedure for the first communication link and the conditional cell change procedure for the second communication link, and to conduct at least one of the link failure recovery process procedure and the conditional cell change procedure according to a result of the processing for controlling the timing.

14 Claims, 14 Drawing Sheets

(51) Int. Cl.
| | | |
|---|---|---|
| *H04W 36/08* | (2009.01) | |
| *H04W 76/19* | (2018.01) | |

(56) References Cited

U.S. PATENT DOCUMENTS

| | | | | |
|---|---|---|---|---|
| 2020/0260304 A1 * | 8/2020 | Zhou | ................. | H04W 52/0235 |
| 2021/0314826 A1 * | 10/2021 | Chang | .............. | H04W 36/0088 |
| 2023/0217327 A1 * | 7/2023 | Yan | ................... | H04W 36/0079 |
| | | | | 455/436 |
| 2023/0292202 A1 * | 9/2023 | Jung | .................... | H04W 48/16 |
| 2024/0340729 A1 * | 10/2024 | Selvaganapathy | ........................... | |
| | | | | H04W 36/00838 |

FOREIGN PATENT DOCUMENTS

| | | |
|---|---|---|
| WO | 2020/128848 A1 | 6/2020 |
| WO | 2022/028921 A1 | 2/2022 |

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.1.0, Mar. 2020, pp. 1-74.

"Msc-generator", Sourceforge, Retrieved on Mar. 30, 2023, Webpage available at : https://sourceforge.net/projects/msc-generator/.

"Fast MCG recovery", 3GPP TSG-RAN WG2 Meeting #109-e, R2-200xxxx, Agenda: 6.10.5, Ericsson, Feb. 24-Mar. 6, 2020, pp. 1-7.

"Remaining issues on conditional intra-SN PSCell change without MN involvement failure handling", 3GPP TSG-RAN WG2 Meeting #109 Electronic, R2-2001150, Agenda: 6.9.4.1, Qualcomm Incorporated, Feb. 24-Mar. 6, 2020, 5 pages.

"PSCell conditional change considerations", 3GPP TSG-RAN WG2 Meeting #107bis, R2-1912242, Agenda: 6.9.4, Spreadtrum Communications, Oct. 14-18, 2019, 3 pages.

Invitation to Pay Additional Fees received for corresponding Patent Cooperation Treaty Application No. PCT/EP2021/072924, dated Nov. 26, 2021, 22 pages.

"[Z277] Discussion on stopping conditional reconfiguration evaluation during fast MCG recovery", 3GPP TSG-RAN2 Meeting #110 electronic, R2-2005347, Agenda: 6.9.5, ZTE Corporation, Jun. 1-12, 2020, 5 pages.

"MCG failure recovery via split SRB1", 3GPP TSG-RAN WG2 #106, R2-1907493, Agenda: 11.10.5, Huawei, May 13-17, 2019, 5 pages.

International Search Report and Written Opinion received for corresponding Patent Cooperation Treaty Application No. PCT/EP2021/072924, dated Jan. 24, 2022, 29 pages.

* cited by examiner

START

S910  DETERMINE THAT LINK FAILURE RECOVERY PROCEDURE FOR FIRST LINK (PCELL) IS CONDUCTED

S920  DETECT THAT CONDITION FOR CONDITIONAL PSCELL CHANGE FOR SECOND LINK (PSCELL) IS MET

S930  EXECUTE PROCESSING FOR CONTROLLING TIMING OF LINK RECOVERY PROCEDURE AND/OR CPC

S940  CONDUCT LINK FAILURE RECOVERY PROCEDURE AND/OR CPC ACCORDING TO TIMING CONTROL

RETURN

CONNECTION SWITCHING CONTROL MECHANISM IN MULTI CONNECTIVITY COMMUNICATION

RELATED APPLICATION

This application was originally filed as PCT Application No. PCT/EP2021/072924, filed on Aug. 18, 2021, which claims priority from IN application Ser. No. 202041039825, filed on Sep. 14, 2020, each of which is incorporated herein by reference in its entirety.

BACKGROUND

Field

Examples of embodiments relate to apparatuses, methods, systems, computer programs, computer program products and (non-transitory) computer-readable media usable for controlling a connection switch in a multi-connectivity communication, such as a wireless dual connectivity communication in a communication network based on 3GPP standards, and in particular to apparatuses, methods, systems, computer programs, computer program products and (non-transitory) computer-readable media usable for controlling a procedure for conditional handover of a connection to a secondary cell, i.e. a cell change, while a failure recovery procedure regarding a connection to a master cell is executed.

Background Art

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

The following meanings for the abbreviations used in this specification apply:

3GPP 3rd Generation Partnership Project
4G fourth generation
5G fifth generation
5GS 5G system
ACK acknowledgement
BS base station
CN core network
CPC conditional PSCell change
CPU central processing unit
DC dual connectivity
DRB data radio bearer
eNB evolved node B
ETSI European Telecommunications Standards Institute
gNB next generation node B
GPRS general packet radio service
HO handover
LTE Long Term Evolution
LTE-A LTE Advanced
MAC medium access control
MCG master cell group
MN master node
MR multi RAT
NF network function
NG new generation
NW network, network side PCell primary cell
PSCell primary secondary cell
RAN radio access network
RAT radio access technology
RLF radio link failure
RRC radio resource control
SCG secondary cell group
SN secondary node
SRB signaling radio bearer
UE user equipment
UMTS universal mobile telecommunication system
UP user plane

SUMMARY

According to an example of an embodiment, there is provided, for example, an apparatus for use by a communication element or function configured to conduct a multi-connectivity communication in a communication network in which at least two communication links are used to at least two different cells formed by at least one network element or function for forming a communication path, the apparatus comprising at least one processing circuitry, and at least one memory for storing instructions to be executed by the processing circuitry, wherein the at least one memory and the instructions are configured to, with the at least one processing circuitry, cause the apparatus at least: to determine that a link failure recovery procedure for a first communication link with a first cell is conducted, to detect that a condition for performing a conditional cell change procedure for a second communication link to a second cell is met, which is to be conducted during the link failure recovery procedure for the first communication link, to execute a processing for controlling a timing for conducting at least one of the link failure recovery procedure for the first communication link and the conditional cell change procedure for the second communication link, and to conduct at least one of the link failure recovery process procedure and the conditional cell change procedure according to a result of the processing for controlling the timing.

Furthermore, according to an example of an embodiment, there is provided, for example, a method for use in a communication element or function configured to conduct a multi-connectivity communication in a communication network in which at least two communication links are used to at least two different cells formed by at least one network element or function for forming a communication path, the method comprising determining that a link failure recovery procedure for a first communication link with a first cell is conducted, detecting that a condition for performing a conditional cell change procedure for a second communication link to a second cell is met, which is to be conducted during the link failure recovery procedure for the first communication link, executing a processing for controlling a timing for conducting at least one of the link failure recovery procedure for the first communication link and the conditional cell change procedure for the second communication link, and conducting at least one of the link failure recovery process procedure and the conditional cell change procedure according to a result of the processing for controlling the timing.

According to further refinements, these examples may include one or more of the following features:

when the link failure recovery procedure is conducted, a
    first timer indicating a time period when a connection
    reestablishment procedure is started for the first com-
    munication link to the first cell may be started;

in the processing for controlling the timing for conducting at least one of the link failure recovery procedure for the first communication link and the conditional cell change procedure for the second communication link, the first timer may be stopped when it is detected that the condition for performing the conditional cell change procedure for the second communication link to the second cell is met, and a second timer indicating a time period when the connection reestablishment procedure is started for the first communication link to the first cell may be started;

at least two different timer values for the first timer may be received, from a communication network control element or function controlling at least one of the first cell and the second cell, and processed, wherein one of the at least two different timer values is applied for the first timer indicating the time period when the connection reestablishment procedure is started for the first communication link to the first cell, and, in the processing for controlling the timing for conducting at least one of the link failure recovery procedure for the first communication link and the conditional cell change procedure for the second communication link, the first timer may be stopped when it is detected that the condition for performing the conditional cell change procedure for the second communication link to the second cell is met, and the first timer may be restarted, wherein another of the at least two timer values is applied for the first timer;

at least two different timer values for the first timer may be received, from a communication network control element or function controlling at least one of the first cell and the second cell, and processed, it may be determined whether a measurement report potentially leading to a conditional cell change procedure for the second communication link to the second cell is sent, and in case the measurement report is sent, a longer one of the at least two different timer values may be applied for the first timer indicating the time period when the connection reestablishment procedure is started for the first communication link to the first cell;

a time value for the first timer and a predetermined threshold may be received, from a communication network control element or function controlling at least one of the first cell and the second cell, and processed, and, in the processing for controlling the timing for conducting at least one of the link failure recovery procedure for the first communication link and the conditional cell change procedure for the second communication link, a remaining time of the first timer may be compared with the predetermined, the conditional cell change procedure for the second communication link to the second cell may be conducted when the remaining time is larger than the predetermined threshold, and the conditional cell change procedure for the second communication link to the second cell may be skipped when the remaining time is not larger than the predetermined threshold;

in the processing for controlling the timing for conducting at least one of the link failure recovery procedure for the first communication link and the conditional cell change procedure for the second communication link, the first timer may be stopped when it is detected that the condition for performing the conditional cell change procedure for the second communication link to the second cell is met, the conditional cell change procedure for the second communication link to the second cell may be skipped and the connection reestablishment procedure for the first communication link to the first cell may be started;

an indication whether or not a late conditional cell change procedure is set may be received, from a communication network control element or function controlling at least one of the first cell and the second cell, and processed, and, in the processing for controlling the timing for conducting at least one of the link failure recovery procedure for the first communication link and the conditional cell change procedure for the second communication link, when a late conditional cell change procedure is set, the conditional cell change procedure for the second communication link to the second cell may be conducted, the first timer may be stopped and a second timer indicating a time period when the connection reestablishment procedure is started for the first communication link to the first cell may be started;

when the link failure recovery procedure for the first communication link with the first cell is conducted, an indication may be sent to a communication network control element of function controlling the second cell that there is a link failure in the first communication link with the first cell, wherein the indication includes an information that a conditional cell change procedure is configured to be executable by the communication element or function;

the first communication link may be a link between the communication element or function and a primary cell of a master cell group established in the communication network, and the second communication link may be a link between the communication element or function and a primary secondary cell of a secondary cell group established in the communication network;

the link failure recovery procedure may be a master cell group failure recovery procedure for recovering the link of the communication element or function and the primary cell of a master cell group by using a communication via the second communication link;

the conditional cell change procedure may comprise to detach from a second cell currently used as the primary secondary cell and to attach to a prepared new second cell to be used as the primary secondary cell, wherein the new second cell may be controlled by the same communication network control element or function as the second cell currently used as the primary secondary cell, or controlled by a different communication network control element or function;

the communication network may be based on a 3GPP standard.

According to an example of an embodiment, there is provided, for example, an apparatus for use by a communication network control element or function configured to control a multi-connectivity communication of a communication element or function in a communication network in which at least two communication links are used to at least two different cells at least one of which being controlled by the communication network control element or function for forming a communication path, the apparatus comprising at least one processing circuitry, and at least one memory for storing instructions to be executed by the processing circuitry, wherein the at least one memory and the instructions are configured to, with the at least one processing circuitry, cause the apparatus at least: to provide, when a link failure recovery procedure for a first communication link with a first cell is conducted and, during the link failure recovery procedure, a conditional cell change procedure for a second communication link to a second cell is conducted, reconfiguration information regarding resource control for the first communication link to a communication network control element or function controlling a target cell in the conditional cell change procedure for the second communication link to a second cell.

Furthermore, according to an example of an embodiment, there is provided, for example, a method for use in a communication network control element or function configured to control a multi-connectivity communication of a communication element or function in a communication network in which at least two communication links are used to at least two different cells at least one of which being controlled by the communication network control element or function for forming a communication path, the method comprising providing, when a link failure recovery procedure for a first communication link with a first cell is conducted and, during the link failure recovery procedure, a conditional cell change procedure for a second communication link to a second cell is conducted, reconfiguration information regarding resource control for the first communication link to a communication network control element or function controlling a target cell in the conditional cell change procedure for the second communication link to a second cell.

According to further refinements, these examples may include one or more of the following features:

the communication network control element or function may be configured to control the second cell with which a communication path is formed when the link failure recovery procedure for the first communication link is started, wherein the reconfiguration information may be provided when an indication of a successful conditional cell change is received from the target cell;

the communication network control element or function may be configured to control the first cell with which a communication path is formed when the link failure recovery procedure for the first communication link is started;

information indicating candidate cells for a conditional cell change for the second communication link to a second cell may be stored, and the reconfiguration information regarding resource control for the first communication link may be provided to each communication network control element or function controlling the candidate cells indicated in the stored information;

information indicating whether the reconfiguration information regarding resource control for the first communication link has a secondary cell group configuration or not may be received from a communication control element or function being involved in the link failure recovery procedure of the first link, and processed, and the received information may be used for deciding on whether to provide the reconfiguration information regarding resource control for the first communication link to a communication network control element or function controlling a target cell in the conditional cell change procedure for the second communication link to a second cell, or not;

the first communication link may be a link between a communication element or function and a primary cell of a master cell group established in the communication network, and the second communication link may be a link between the communication element or function and a primary secondary cell of a secondary cell group established in the communication network;

the link failure recovery procedure may be a master cell group failure recovery procedure for recovering the link of the communication element or function and the primary cell of a master cell group by using a communication via the second communication link;

the conditional cell change procedure may comprise to detach from a second cell currently used as the primary secondary cell and to attach to a prepared new second cell to be used as the primary secondary cell, wherein the new second cell may be controlled by the same communication network control element or function as the second cell currently used as the primary secondary cell, or controlled by a different communication network control element or function;

the communication network may be based on a 3GPP standard.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present disclosure are described below, by way of example only, with reference to the accompanying drawings, in which.

DESCRIPTION OF EMBODIMENTS

Figure 1:
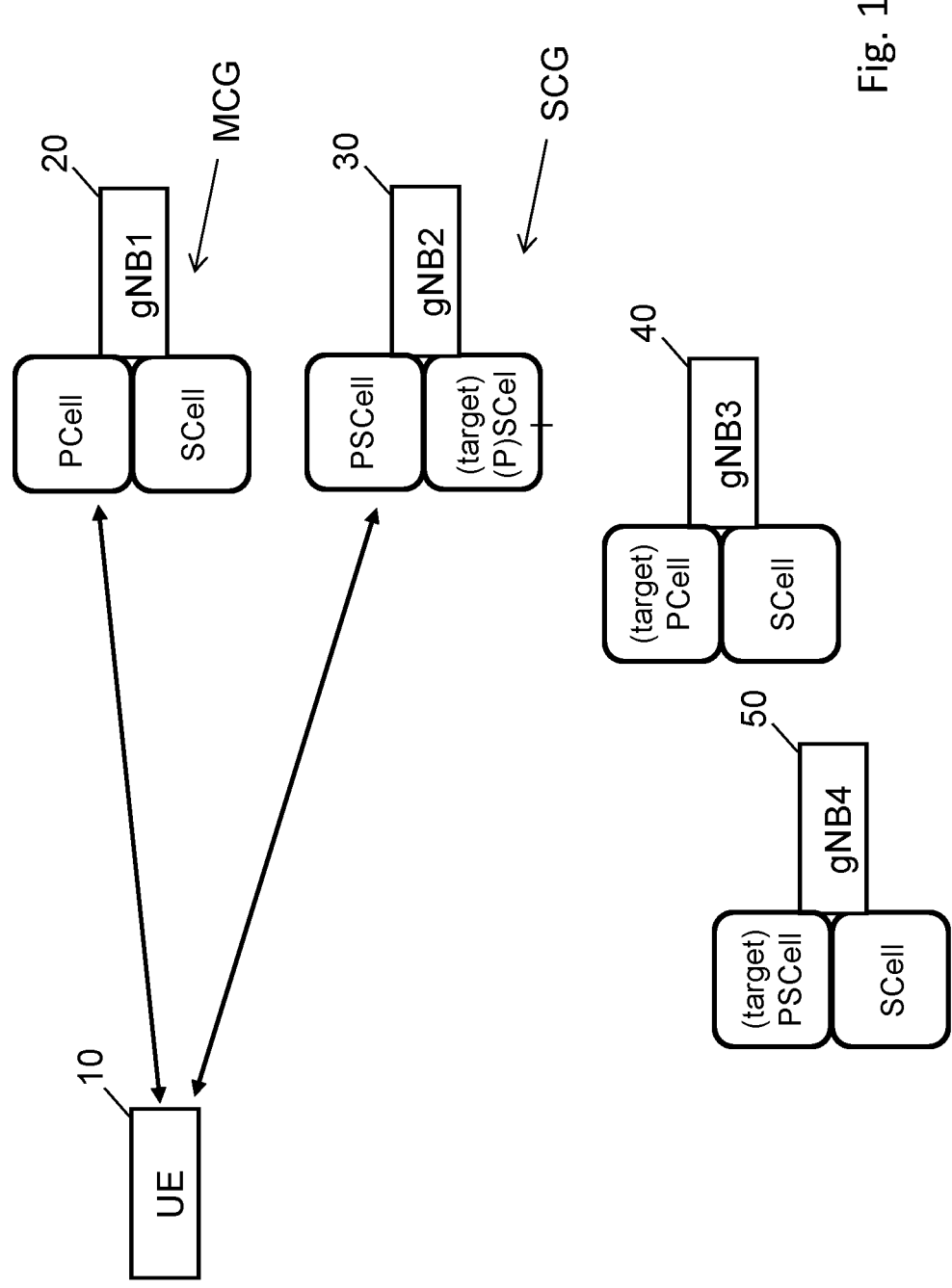
FIG. 1 shows a diagram illustrating an example of a communication network in which examples of embodiments are implementable.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Basically, for properly establishing and handling a communication between two or more endpoints (e.g. communication stations or elements, such as terminal devices, user equipments (UEs), or other communication network elements, a database, a server, host etc.), one or more network elements or functions (e.g. virtualized network functions), such as communication network control elements or functions, for example access network elements like access points, radio base stations, relay stations, eNBs, gNBs etc., and core network elements or functions, for example control nodes, support nodes, service nodes, gateways, user plane functions, access and mobility functions etc., may be involved, which may belong to one communication network system or different communication network systems.

Dual connectivity concepts, such as multi radio DC, are used to increase the performance of communication networks. A multiple Rx/Tx capable UE may be configured to use resources provided by two different nodes connected via (non-ideal) backhaul, one providing e.g. NR access and the other one providing either E-UTRA or NR access, for example. One node acts as a master node (MN) and the other as a secondary node (SN). The MN and SN are connected, for example, via a network interface and at least the MN is connected to the core network.

A MN is the node (e.g. a radio access node, such as a gNB or the like) that provides the control plane connection to the core network in case of multi radio dual connectivity. The secondary node is, for example, a radio access node, with no control plane connection to the core network, providing additional resources to the UE in case of DC.

A master cell group (MCG) is a group of serving cells associated with the MN, comprising of the primary cell (PCell) and optionally one or more secondary cells (SCells).

A secondary cell group (SCG), on the other hand, is a group of serving cells associated with the SN, comprising of a primary secondary cell (PSCell) and optionally one or more SCells.

MCG and SCG are concepts under dual connectivity (DC, Dual connectivity).

Under MCG, there may be many cells, one of which is used to initiate initial access, perform Radio Link Monitoring (RLM) of MCG and transmit Physical Uplink Control Channel (PUCCH). This cell is the PCell. Similarly, there is also a main cell under the SCG, that is, the PSCell, which can also be understood as the cell used for the initial access under the SCG, performing RLM of SCG and PUCCH transmission It is to be noted that the MN and/or the SN can be operated with shared spectrum channel access.

In MR-DC, for example, there is an interface between the MN and the SN for control plane signalling and coordination. For each MR-DC UE, there is also one control plane connection between the MN and a corresponding CN entity. The MN and the SN involved in MR-DC for a certain UE control their radio resources and are primarily responsible for allocating radio resources of their cells.

FIG. 1 shows a diagram illustrating an example of a communication network involving MR-DC. It is to be noted that the network architecture shown in FIG. 1 is configured to implement also examples of embodiments to be described below.

As shown in FIG. 1, a communication element such as a UE 10 establishes a dual connectivity based communication connection with a communication network. In the communication network, in the example indicated in FIG. 1, four communication network control elements or functions are located each of which representing a network node with which the UE 10 can communicate. In the example of FIG. 1, respective gNBs 20, 30, 40, 50 are shown, but it is to be noted that the number of communication network control elements as well as the type (e.g. other access network elements, such as eNBs, base stations etc.) which can be used is not limited to those shown in FIG. 1.

Each of the communication network control elements or functions 20, 30, 40 and 50 controls one or more cells (in the example shown in FIG. 1, two cells per gNB are shown, but the number may be different). In the example shown in FIG. 1, it is assumed that the communication element or function UE 10 is configured to simultaneously connect to the gNB 20 and gNB 30 (i.e., dual connectivity (DC)). That is, the UE 10 in the DC may perform a transmission/reception via both the gNB 20 and gNB 30. For example, the UE 10 may receive packets from the gNB 20 at a first carrier frequency and the gNB 30 at a second carrier frequency, or the UE 10 may transmit packets to the gNB 20 at a first carrier frequency and the gNB 30 at a second carrier frequency. In addition, one of the gNBs (in FIG. 1, gNB 20) represents a master node (MN), wherein the cell with which the UE 10 is connected is a PCell, while the other gNB 30 is a secondary node (SN), wherein the cell with which the UE 10 is connected is a PSCell. gNB 20 forms MCG, while gNB 30 forms SCG, in the situation illustrated in FIG. 1. The first carrier frequency and the second carrier frequency may or may not be overlapped.

It is to be noted that the system configuration and communication path indicated in FIG. 1 represents only an example for illustrative purposes. It is evident that also other system configurations and communication paths can be applied in a similar manner.

During communication, failure conditions such as a radio link failure (RLF) may occur. RLF, as an example of such a failure condition, is declared separately for the MCG and for the SCG.

Generally, in a system like that shown in FIG. 1, in case an RLF is detected for MCG, one possibility to handle this situation is a so-called fast MCG link failure recovery which is triggered by the UE 10. Otherwise, the UE initiates an RRC connection re-establishment procedure.

During fast MCG link failure recovery, the UE 10 suspends MCG transmissions for all radio bearers and reports the failure with MCG Failure Information message to the MN via the SCG, using the SCG leg of split SRB1 or SRB3. The UE includes in the MCG Failure Information message the measurement results available according to current measurement configuration of both the MN and the SN. Once the fast MCG link failure recovery is triggered, the UE maintains the current measurement configurations from both the MN and the SN, and continues measurements based on configuration from the MN and the SN, if possible. The UE initiates the RRC connection re-establishment procedure if it does not receive an RRC reconfiguration indication, such as a RRC reconfiguration message (Reconfiguration with sync., i.e. HO command) or RRC release message within a certain time after fast MCG link failure recovery was initiated.

Upon reception of the MCG Failure Indication, the MN can send the RRC reconfiguration information, such as a RRC reconfiguration message, or RRC release message to the UE, using the SCG leg of split SRB1 or SRB3. Upon receiving e.g. an RRC reconfiguration message (Reconfiguration with sync., i.e. HO command), the UE initiates the random access procedure to the target PCell. Upon receiving an RRC release message, the UE releases all the radio bearers and configurations.

It is to be noted that upon an SCG failure, if MCG transmissions of radio bearers are not suspended, the UE suspends SCG transmissions for all radio bearers and reports the SCG Failure Information to the MN, instead of triggering re-establishment. If SCG failure is detected while MCG transmissions for all radio bearers are suspended, the UE initiates the RRC connection re-establishment procedure.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB, a radio network controller, a core network control element or function, such as a gateway element, or other network elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

Examples of embodiments relate to a control of a connection switch in a multi-connectivity communication, such as a wireless dual connectivity communication in a communication network, in particular to a control of a procedure for conditional cell change or handover of a connection to a secondary cell while a failure recovery procedure regarding a connection to a master cell is executed. That is, examples of embodiments of the invention are applicable, for example, to a situation involving conditional PSCell change (CPC) during a Master Cell Group (MCG) failure recovery.

As indicated above, MCG failure recovery serves to recover the radio link of the PCell in the MN using the radio link of PSCell in the SN. In the example of FIG. 1, PCell is assumed to be controlled by gNB 20 (forming the source MN) and PSCell is assumed to be controlled by gNB 30 (forming the source SN).

In the following, source MN is referred to as MN1, while source SN is referred to SN1. Furthermore, a target MN (i.e. a node assumed to become MN in a handover or switching procedure) is referred to as MN2, while a target SN (i.e. a node assumed to become SN in a handover or switching procedure) is referred to as SN2.

The UE 10 that is configured with a specific timer (referred to as timer T316) and with split Signaling Radio Bearer (SRB) 1 or SRB3 initiates the procedure to report MCG failure when neither MCG nor Secondary Cell Group (SCG) transmission is suspended.

When the MCG failure occurs, the UE 10 follows SCG failure-like procedure, i.e. the UE 10 does not trigger RRC connection re-establishment. Rather, upon initiating the link failure recovery procedure, the UE 10 suspends MCG transmission for all SRBs and Data Radio Bearers (DRBs) (except SRB0). Then, the UE 10 resets MCG-Medium Access Control (MAC). The current measurement configurations from both the MN and the SN are maintained. Next, the UE 10 starts timer T316 and initiates the transmission of the MCG Failure Information containing the failure type (for example, expiry of timer T310 or random access problem, or maximum number of retransmissions has been reached), measurement results for MCG and SCG to the SN via SRB1-split bearer or SRB3.

Then the UE 10 waits for an RRC reconfiguration information (e.g. either RRC Release or the RRC Reconfiguration (Reconfiguration with sync/HO command)) from the MN1 (i.e. gNB 20). This information is to be sent via the SN1 (i.e. gNB 30). If such an information is received, the timer T316 is stopped. Otherwise, in case the timer T316 expires beforehand, the UE performs connection re-establishment (i.e. link failure recovery is stopped).

Another procedure used for a scenario like that shown in FIG. 1 (i.e. DC communication) is a conditional PSCell change (CPC) in order to switch the PSCell. Upon receiving some measurements from the UE, the source PSCell (in FIG. 1, cell controlled by SN1) may prepare one or multiple target PSCells in same SN (i.e. other cell of gNB 30) or in a different node, i.e. a different SN (in the example shown in FIG. 1, it is assumed that a cell of gNB 50 is another candidate for becoming PSCell).

The source PSCell provides the UE 10 with a CPC execution condition along with the configurations of the prepared PSCells.

Once the CPC execution condition is met at the UE 10, the UE 10 detaches from the source PSCell and performs access to the target PSCell (which has been already prepared for this). According to the presently discussed example, in case the CPC command was configured via SRB1, the UE needs to send RRC Reconfiguration Complete message to the MN when CPC execution condition is met. This is not required if the CPC command is received via SRB3 of SN.

It is to be noted that in case during the execution of CPC radio link failure is detected for MCG, the UE initiates the RRC connection re-establishment procedure.

With the above described procedures related to a MCG failure recovery and a PSCell change, the following may occur.

During MCG Failure recovery procedure, it may happen that the CPC execution condition is met. This situation is shown in the signaling diagrams according to FIGS. 2 and 3.

Figure 2:
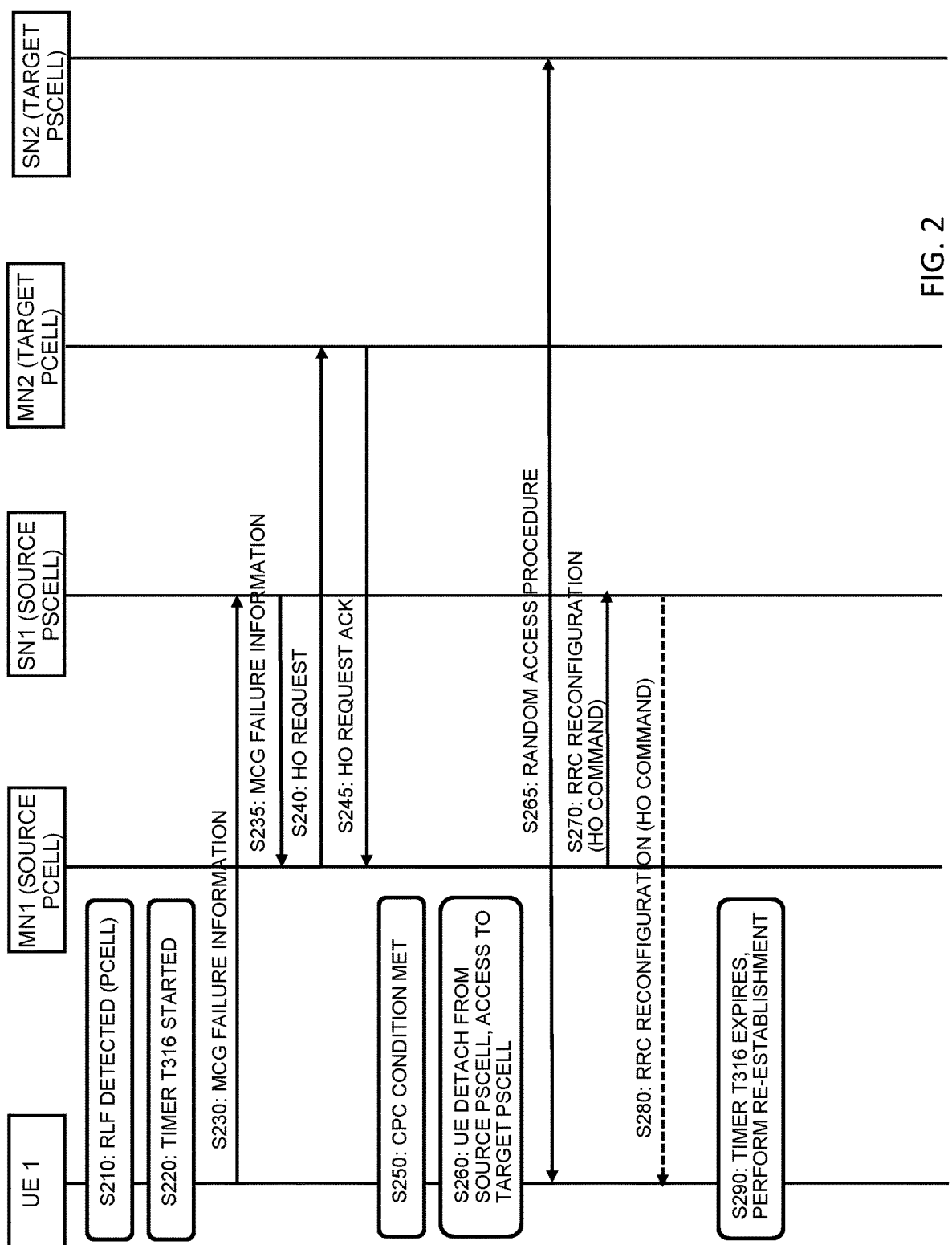
FIG. 2 shows a signaling diagram explaining a common procedure regarding a CPC execution during an MCG failure recovery.
Figure 3:
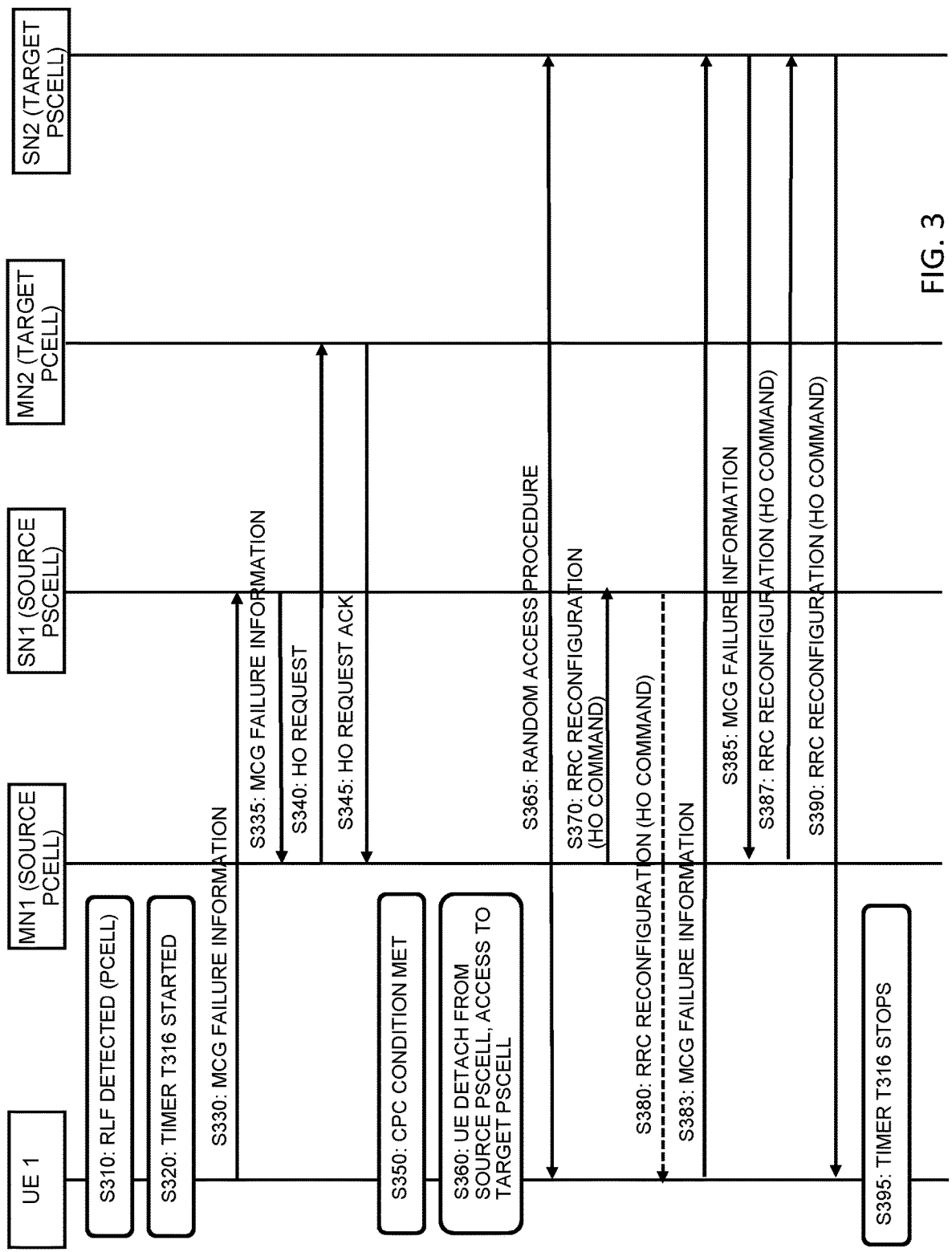
FIG. 3 shows a signaling diagram explaining a common procedure regarding a CPC execution during an MCG failure recovery.

That is, in S210 of FIG. 2 (or S310 of FIG. 3), an RLF is detected at source PCell and UE 10 starts timer T316 for MCG Failure Recovery (in S220 of FIG. 2 or S320 of FIG. 3).

In accordance with the above described procedure, in S230 of FIG. 2 (or S330 of FIG. 3), the UE 10 sends the MCG failure information to the SN1 (PSCell) (e.g. gNB 30). The SN1 informs the MN1 (gNB 20) about the MCG failure information in S235 of FIG. 2 (or S335 of FIG. 3). The MN1 sends in S240 of FIG. 2 (or S340 of FIG. 3) a handover (HO) request to a communication network control element of the communication network (e.g. gNB 40 shown in FIG. 1) in order to initiate a handover of the UE to MN2 (target PCell). MN2 acknowledges the HO request in S245 of FIG. 2 (or S345 of FIG. 3).

Now, while waiting for the RRC Reconfiguration or RRC Release to be received via the source PSCell, the CPC execution condition is determined to be met by the UE 10 in S250 of FIG. 2 (or S350 of FIG. 3).

Accordingly, as indicated above, the UE 10 detaches from the source PSCell and accesses to a (new) target PSCell (in the present example, this is assumed to be controlled either by gNB 30 (intra-SN CPC) or by gNB 50 (inter-SN CPC) becoming SN2, in S260 of FIG. 2 (or S360 of FIG. 3). Hence, a random access procedure to SN2 is executed by UE 10 in S265 of FIG. 2 (or S365 of FIG. 3).

However, when the CPC is executed, it may happen that the timer T316 expires before or during the UE completes the random access to the target PSCell (in SN2). In the example of FIG. 2, for example in case of intra-SN CPC in which SN1 and SN2 are in the same entity (gNB 30), T316 expires at the UE 10 before it manages to send MCG Failure Information to the target PSCell. On the other hand, the MN1 sends the RRC reconfiguration information in S270 of FIG. 2 to the SN1 (source PSCell). However, the RRC reconfiguration information sent by source PSCell in step S280 (dashed arrow) cannot be received by the UE 10 which has detached from the source PSCell in step S260. Therefore, the timer T316 expires in S290 and a connection reestablishment is to be conducted.

Therefore, it can be considered that in case the UE 10 had not detached from the SN1 it could have some chance to receive the RRC Reconfiguration/Release from the SN1, and saved the unnecessary interruption time on user plane (by detaching from source PSCell) and the unnecessary signaling for performing random access to target PSCell.

However, waiting for the RRC Reconfiguration/Release to be received from the source PSCell may not be advantageous if the CPC execution condition has been met or configured for mobility robustness (configuring to UE a late detach from source PSCell increasing the success of the random access to the target PSCell). In this case, the radio link of the source PSCell can be considered unreliable and waiting for timer T316 to expire will only increase the outage of source PCell and delay the recovery of the PCell. In addition, waiting after CPC execution condition has been met may lead to the failure of source PSCell, i.e., Secondary Radio Link Failure (S-RLF). As in this case the UE would have detected both RLF on PCell and PSCell, it will perform re-establishment.

Also configuring a much longer T316 value to account for the case when CPC might be triggered during MCG failure recovery is not optimal. This approach has the main drawback that the recovery of the PCell would be unnecessarily delayed 1) for UEs which are not configured with CPC (MN1 may not be aware if a UE is configured with CPC in case it is configured by SN1 without MN1 involvement) or 2) for UEs which are configured with CPC but CPC execution condition is not met during MCG failure recovery. Delaying MCG failure recovery increases the outage of the PCell radio link and defers the recovery.

Another problem which may occur when CPC procedure is executed during MCG failure recovery is further explained in FIG. 3. Here, in contrast to the situation explained in connection with FIG. 2, it is assumed that the timer T316 has not yet expired, i.e. the UE 10 manages to send MCG Failure Information to the target PSCell. The MN1 sends the RRC reconfiguration information in S370 of FIG. 3 to the SN1 (source PSCell). The RRC reconfiguration information sent by source PSCell in step S380 (dashed arrow) cannot be received by the UE 10 which has detached from the source PSCell in step S360, as in the example explained in FIG. 2.

However, in the example of FIG. 3, the UE 10 sends in S383 the MCG failure information to the PSCell (SN2). The SN2 informs the MN1 (gNB 20) about the MCG failure information in S385 (comparable to S335). The MN1 sends, in return, in S387 the RRC reconfiguration information including the handover command to the SN2. The SN2 can forward now the RRC reconfiguration information to the UE 10 in S390. Correspondingly, the UE 10 stops the timer T316 and performs RRC reconfiguration procedure. Thus, recovering the PCell by information received from the target PSCell can be completed.

However, the signaling for MCG recovery procedure via target PSCell is not efficient. Signaling in S383, S385, S387 is basically the same as signaling in S330, S335 and S370, i.e. repeated by the target PSCell for fetching the RRC reconfiguration information (RRC Reconfiguration/RRC Release) from the MN1. This repetition increases the signaling overhead and delays further the recovery of the PCell which may result in re-establishment if T316 expires before the reception of the RRC Reconfiguration/Release from the target PSCell.

With regard to FIG. 4, which shows a signaling diagram explaining a procedure regarding a CPC execution during an MCG failure recovery, an example of an embodiment is described which is related to the problem described in connection with FIG. 2.

Figure 4:
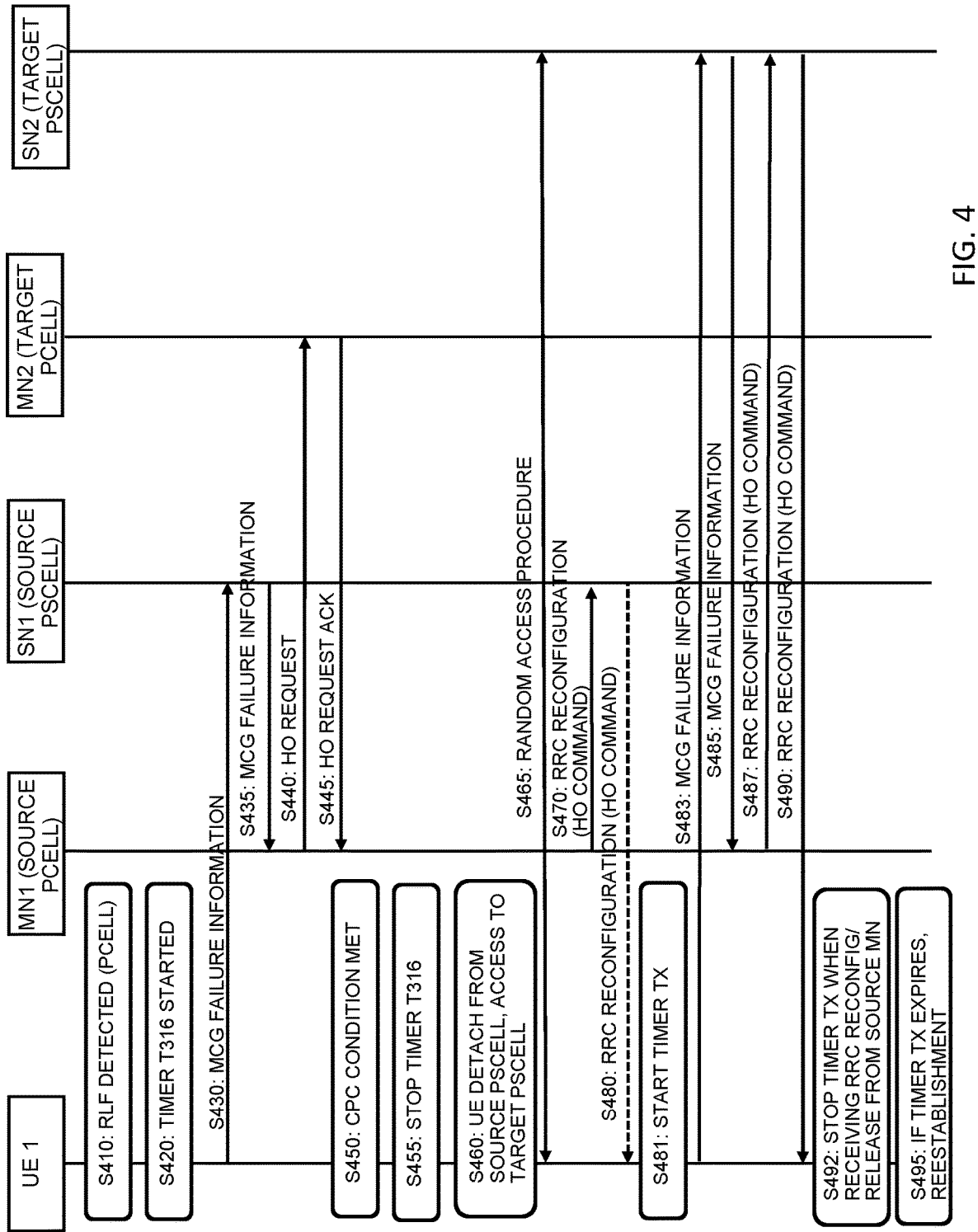
FIG. 4 shows a signaling diagram explaining a procedure regarding a CPC execution during an MCG failure recovery according to an example of an embodiment.

Specifically, in the example of embodiment as shown in FIG. 4, it is ensured that the UE has enough time to complete CPC execution and receive the new RRC Reconfiguration/Release from the target PSCell when CPC execution condition is met during MCG recovery.

In detail, in some embodiments, the time duration for MCG failure recovery (i.e. based on timer T316) is extended. As shown in FIG. 4, during MCG Failure recovery procedure, the CPC execution condition is met. That is, in S410, an RLF is detected at source PCell and UE 10 starts timer T316 for MCG Failure Recovery in S420.

In S430, the UE 10 sends the MCG failure information to the connected SN1 (PSCell) (e.g. gNB 30). The SN1 informs the MN1 (gNB 20) about the MCG failure information in S435. The MN1 sends in S440 a HO request to a communication network control element of the communication network (e.g. gNB 40 shown in FIG. 1) in order to initiate a handover of the UE to MN2 (a target PCell). The MN2 acknowledges the HO request in S445.

In S450, while waiting for the RRC Reconfiguration or RRC Release to be received via the source PSCell, the CPC execution condition is determined to be met by the UE 10.

According to the present example of embodiment, the timer indicating the time period for the MCG failure recovery (i.e. the timer indicating until when the reestablishment procedure is to be started, that is T316) is stopped in S455.

In S460 the UE 10 detaches from the source PSCell and accesses to a (new) target PSCell (in the present example, this is assumed to be controlled either by gNB 30 (intra-SN CPC) or by gNB 50 (inter-SN CPC) becoming SN2). Hence, a random access procedure to SN2 is executed by UE 10 in S465.

After having stopped timer T316 in S455 when CPC execution condition is met, when the attachment to the target PSCell in SN2 is made, in S481, the UE 10 starts a new timer Tx, when it sends MCG failure information to the target cell PSCell in S483. It is to be noted that in the meantime, as indicated by S470 and S480, an attempt by the source PSCell to inform about the RRC reconfiguration may fail, as also the case in the example described in connection with FIG. 2.

In S485, S487 and S490, similar to a processing as described above, the SN2 informs the MN1 (gNB 20) about the MCG failure information, while the MN1 sends, in return, the RRC reconfiguration information including the handover command to the SN2. The SN2 can forward now the RRC reconfiguration information to the UE 10.

The UE 10 stops the timer TX and performs RRC reconfiguration procedure when receiving the RRC reconfiguration or RRC release message (S492). Otherwise, in case timer TX expires, the UE performs re-establishment of the source PCell (S495).

It is to be noted that according to a further example of embodiments, the value of the new timer TX in S481 is the same as that of the timer T316. That is, timer T316 is actually restarted upon initiating MCG Failure Information to the target PSCell. However, the value of timer TX may be also different to that of T316 and can be configured independently.

According to another example of embodiments, the MCG failure information that is sent to target PSCell in S483 is extended with an indication that the timer TX for MCG failure recovery has been (re)started.

With regard to FIG. 5, which shows a signaling diagram explaining a procedure regarding a CPC execution during an MCG failure recovery, a further example of an embodiment is described which is related to the problem described in connection with FIG. 2.

Figure 5:
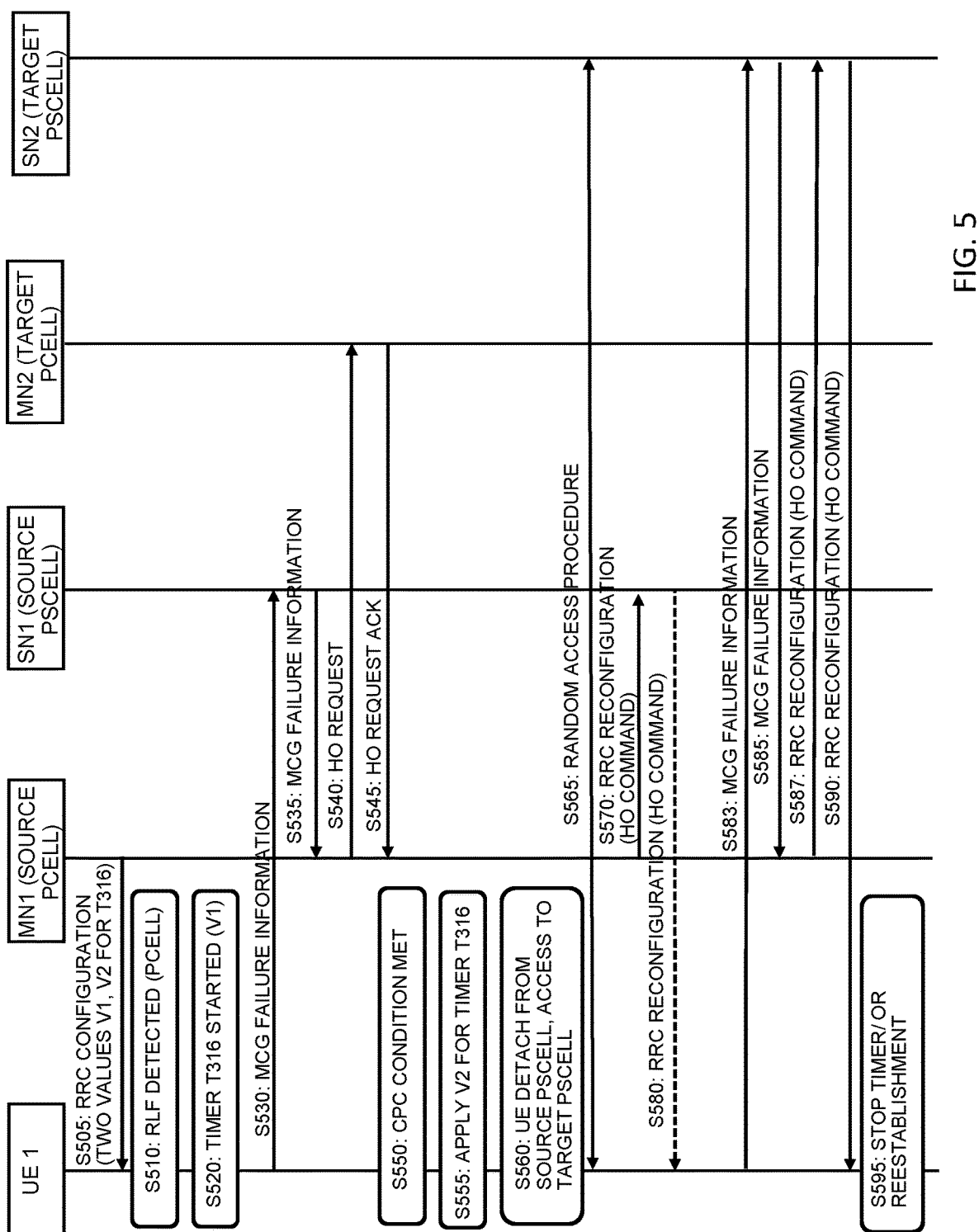
FIG. 5 shows a signaling diagram explaining a procedure regarding a CPC execution during an MCG failure recovery according to an example of an embodiment.

Specifically, also in the example of embodiment as shown in FIG. 5, it is ensured that the UE has enough time to complete CPC execution and receive the new RRC Reconfiguration/Release from the target PSCell when CPC execution condition is met during MCG recovery.

In detail, in some embodiments, the time duration for MCG failure recovery (i.e. based on timer T316) is extended. As shown in FIG. 5, in S505, the MN1, i.e. the source PCell provides the UE 10 with two values for timer T316: Value V1 and V2. It is to be noted that it is possible that also more than two different values for timers are provided which may be applicable under different circumstances (e.g. configured in the UE 10).

In S510, an RLF is detected at source PCell. In S520, UE 10 starts timer T316 for MCG Failure Recovery. According to the present example of embodiments, the UE 10 applies, for example, a short value (e.g. value V1) of T316 when it starts MCG failure recovery procedure.

In S530, the UE 10 sends the MCG failure information to the SN1 (PSCell) (e.g. gNB 30). The SN1 informs the MN1 (gNB 20) about the MCG failure information in S535. The MN1 sends in S540 a HO request to a communication network control element of the communication network (e.g.

gNB 40 shown in FIG. 1) in order to initiate a handover of the UE to MN2 (a target PCell). The MN2 acknowledges the HO request in S545.

In S550, while waiting for the RRC Reconfiguration or RRC Release to be received via the source PSCell, the CPC execution condition is determined to be met by the UE 10.

According to the present example of embodiment, the UE 10 applies, when it is determined that the CPC condition is met while timer T316 is running, the other value (e.g. the longer value) V2 for T316.

In S560 the UE 10 detaches from the source PSCell and accesses to a (new) target PSCell (in the present example, this is assumed to be controlled either by gNB 30 (intra-SN CPC) or by gNB 50 (inter-SN CPC) becoming SN2). Hence, a random access procedure to SN2 is executed by UE 10 in S565.

In S583, the UE 10 sends MCG failure information to the target PSCell. It is to be noted that in the meantime, as indicated by S570 and S580, an attempt by the source PSCell to inform about the RRC reconfiguration may fail, as also the case in the example described in connection with FIG. 2.

In S585, S587 and S590, similar to a processing as described above, the SN2 informs the MN1 (gNB 20) about the MCG failure information, while the MN1 sends, in return, the RRC reconfiguration information including the handover command to the SN2. The SN2 can forward now the RRC reconfiguration information to the UE 10.

In S595, the UE 10 stops the timer T316 and performs RRC reconfiguration procedure when receiving the RRC reconfiguration or RRC release message. Otherwise, in case timer T316 expires, the UE performs re-establishment of the source PCell.

According to some examples of embodiments, the UE 10 may apply the longer value of T316 (i.e. V2) if it has triggered a measurement report to SN1 (e.g. an A3 event triggered measurement report which may lead to PSCell change) prior to the detection of the RLF in PCell. That is, the longer value may be applied directly for T316 from the beginning.

With regard to FIG. 6, which shows a signaling diagram explaining a procedure regarding a CPC execution during an MCG failure recovery, a further example of an embodiment is described which is related to the problem described in connection with FIG. 2.

Figure 6:
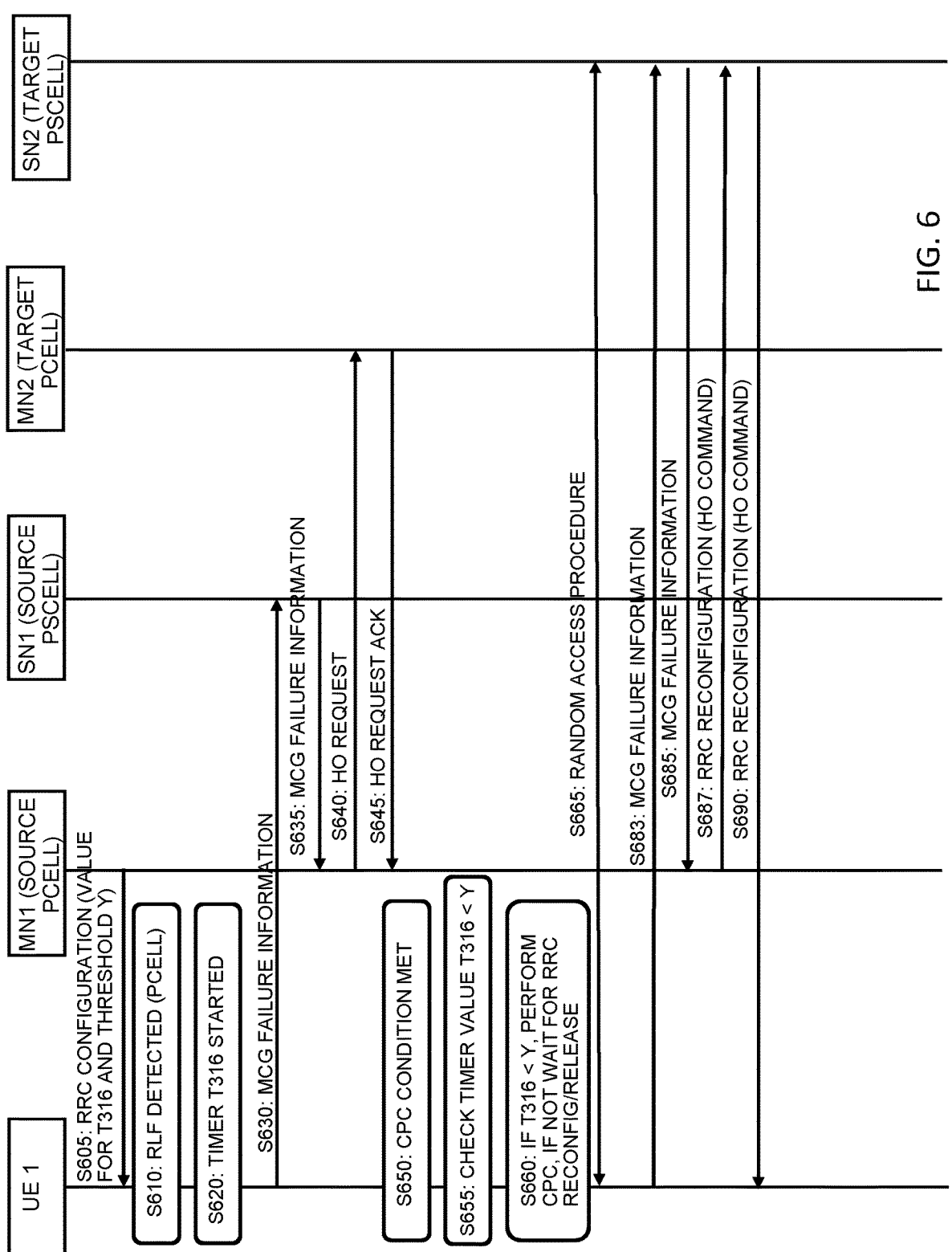
FIG. 6 shows a signaling diagram explaining a procedure regarding a CPC execution during an MCG failure recovery according to an example of an embodiment.

Specifically, also in the example of embodiment as shown in FIG. 6, it is ensured that the UE has enough time to complete CPC execution and receive the new RRC Reconfiguration/Release from the target PSCell when CPC execution condition is met during MCG failure recovery. In detail, according to some examples of embodiments, the CPC is performed only if it is deemed by the UE 10, using assistance data from the network, that it can complete the CPC execution and receive the RRC Reconfiguration/Release before timer T316 for MCG failure recovery expires.

As shown in FIG. 6, in S605, the MN1, i.e. the source PCell provides the UE 10 with RRC configuration information, including a value to be used for timer T316, and a threshold Y which indicates a time period being shorter than the timer value of T316.

In S610, an RLF is detected at source PCell. In S620, UE 10 starts timer T316 for MCG Failure Recovery.

In S630, the UE 10 sends the MCG failure information to the SN1 (PSCell) (e.g. gNB 30). The SN1 informs the MN1 (gNB 20) about the MCG failure information in S635. The MN1 sends in S640 a HO request to a communication network control element of the communication network (e.g.

gNB 40 shown in FIG. 1) in order to initiate a handover of the UE to MN2 (a target PCell). The MN2 acknowledges the HO request in S645.

In S650, while waiting for the RRC Reconfiguration or RRC Release to be received via the source PSCell, the CPC execution condition is determined to be met by the UE 10.

According to the present example of embodiment, in S655, when CPC execution condition is met, the UE 10 checks whether the current value of timer T316 is below the threshold Y that is provided by source PCell in S605. In other words, it is checked whether the remaining time until timer T316 expires is long enough to allow the CPC procedure to be completed and reconfiguration information being successfully transmitted to the UE 10 by the target PSCell.

If this is the case, the UE performs CPC execution. Otherwise the UE 10 waits for the RRC Reconfiguration/Release from the source PSCell (i.e. it does not execute (skips) the CPC procedure).

In S660, assuming the check in S655 is affirmative, the UE 10 detaches from the source PSCell and accesses to a (new) target PSCell (in the present example, this is assumed to be controlled either by gNB 30 (intra-SN CPC) or by gNB 50 (inter-SN CPC). Hence, a random access procedure to SN2 is executed by UE 10 in S665.

In S683, the UE 10 sends MCG failure information to the target PSCell. In S685, S687 and S690, similar to a processing as described above, the SN2 informs the MN1 (gNB 20) about the MCG failure information, while the MN1 sends, in return, the RRC reconfiguration information including the handover command to the SN2. The SN2 can forward now the RRC reconfiguration information to the UE 10.

That is, according to the example described in connection with FIG. 6, the configuration of timer T316 in S605 provides a maximum value for timer T316, i.e., timer T316 is started in S620 and will expire if it reaches the maximum value leading to re-establishment. In S655, when CPC execution condition is met, the UE compares the current value of the timer T316 (i.e. before expiry) against the threshold Y (fixed value and provided by the MN1 in S605). If the current value of timer T316<Y, the UE performs CPC, otherwise the UE does not execute CPC and waits to receive RRC Reconfiguration/Release from the SN1. That is, it is checked whether the remaining time of T316 before expiry is long enough to complete the CPC.

With regard to FIG. 7, which shows a signaling diagram explaining a procedure regarding a CPC execution during an MCG failure recovery, another example of an embodiment is described which is related to the problem described in connection with FIG. 2.

Figure 7:
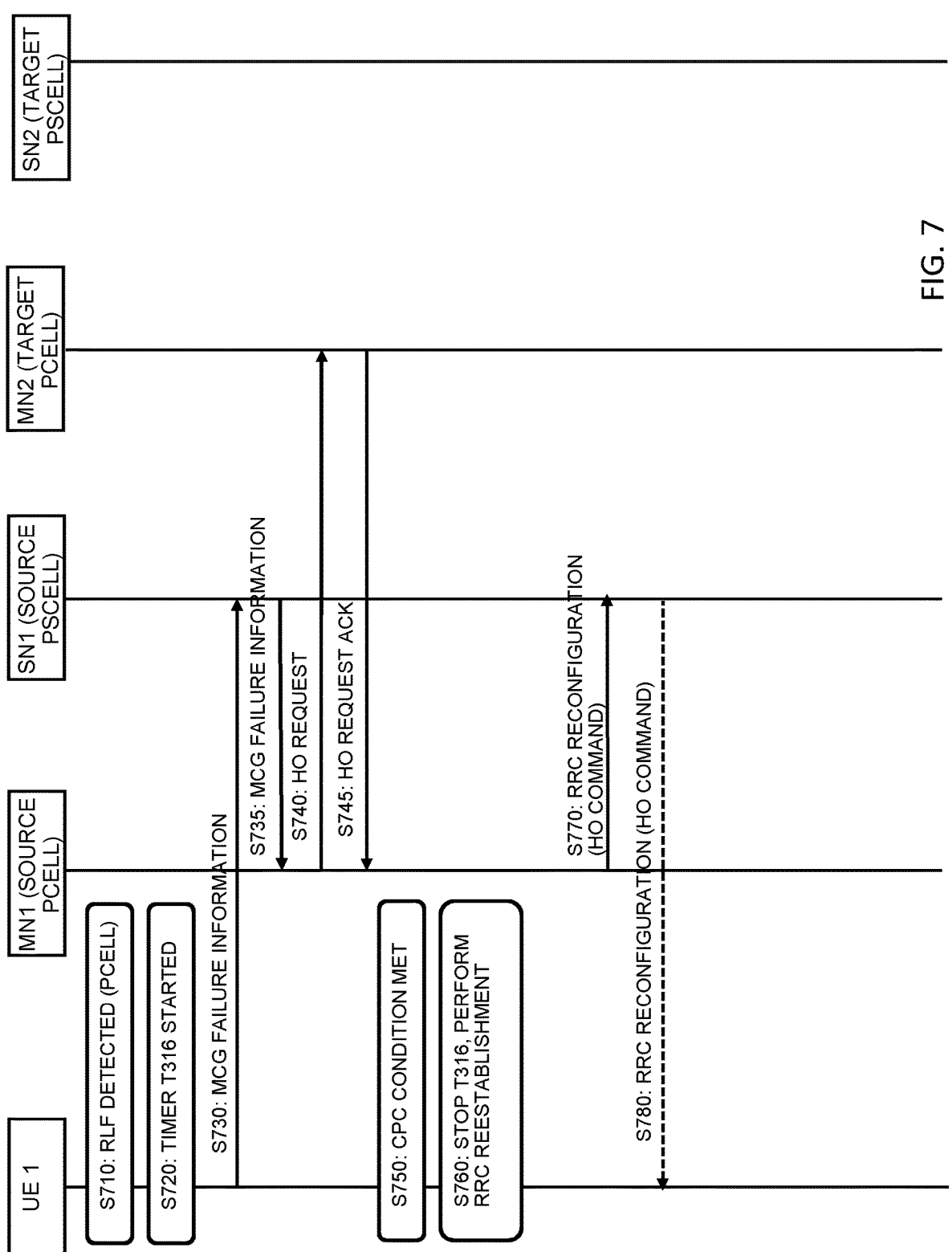
FIG. 7 shows a signaling diagram explaining a procedure regarding a CPC execution during an MCG failure recovery according to an example of an embodiment.

Specifically, in the example of embodiment as shown in FIG. 7, the MCG failure recovery procedure (i.e. performing early recovery of PCell) is terminated early depending on whether a predetermined condition has been fulfilled.

As shown in FIG. 7, during MCG failure recovery procedure, the CPC execution condition is met. That is, in S710, an RLF is detected at source PCell and UE 10 starts timer T316 for MCG Failure Recovery in S720.

In S730, the UE 10 sends the MCG failure information to the connected SN1 (PSCell) (e.g. gNB 30). The SN1 informs the MN1 (gNB 20) about the MCG failure information in S735. The MN1 sends in S740 a HO request to a communication network control element of the communication network (e.g. gNB 40 shown in FIG. 1) in order to initiate a handover of the UE to MN2 (a target PCell). The MN2 acknowledges the HO request in S745.

In S750, while waiting for the RRC Reconfiguration or RRC Release to be received via the source PSCell, the CPC execution condition is determined to be met by the UE 10.

According to the present example of embodiment, the UE 10 stops, in S760, timer T316 when CPC execution condition has been met. In addition, RRC re-establishment procedure is started by UE 10. Due to this, as indicated by S770 and S780, an attempt by the source PSCell to inform about the RRC reconfiguration fails, as also the case in the example described in connection with FIG. 2.

With regard to FIG. 8, which shows a signaling diagram explaining a procedure regarding a CPC execution during an MCG failure recovery, another example of an embodiment is described which is related to the problem described in connection with FIG. 2.

Figure 8:
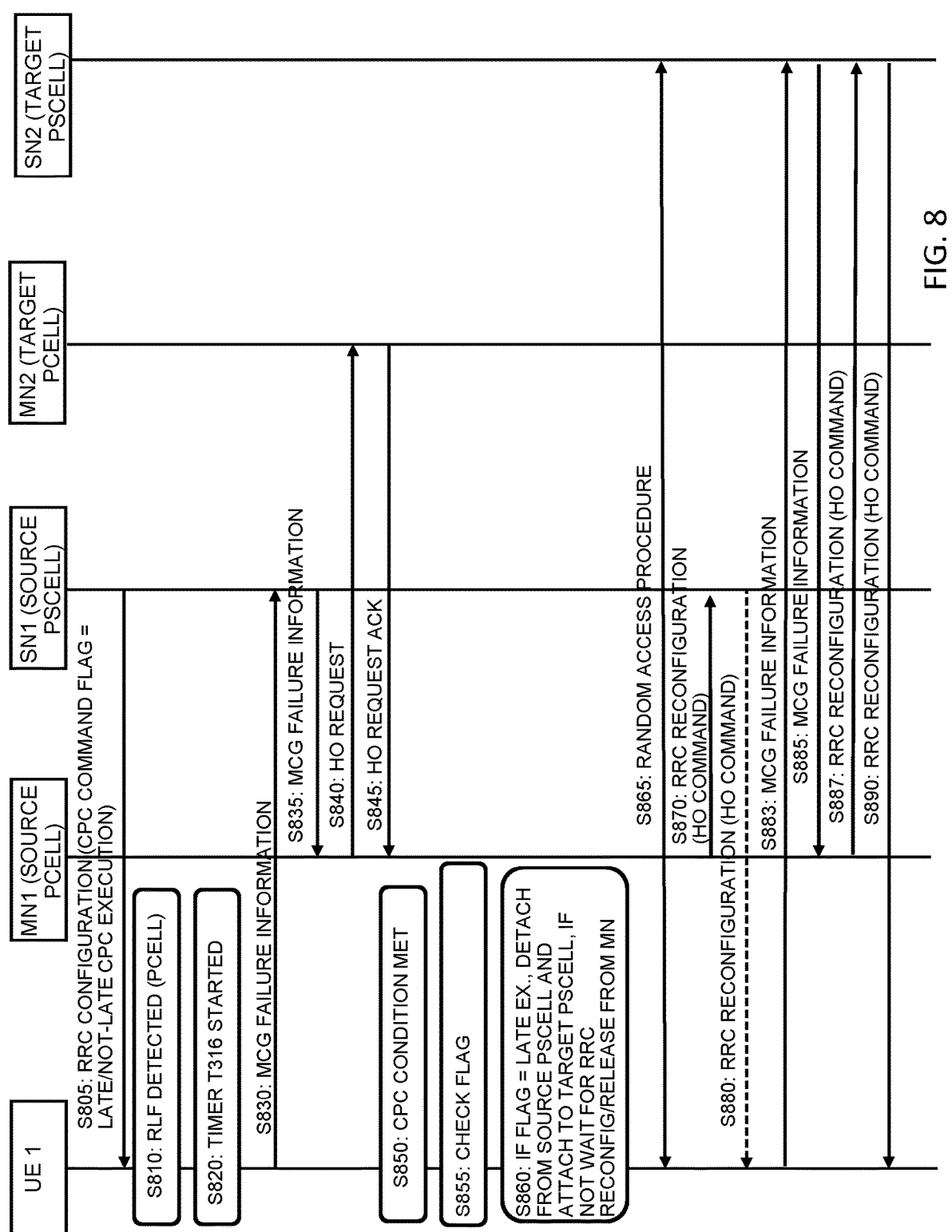
FIG. 8 shows a signaling diagram explaining a procedure regarding a CPC execution during an MCG failure recovery according to an example of an embodiment.

Specifically, also in the example of embodiment as shown in FIG. 8, the MCG failure recovery procedure (i.e. performing early recovery of PCell) is terminated early depending on whether a predetermined condition has been fulfilled. In detail, according to the example described in connection with FIG. 8, the UE 10 stops timer T316 when CPC execution condition has been met and when the UE 10 was configured for mobility robustness/late access to the target cell.

As shown in FIG. 8, the SN1 provides in S805 the UE 10 with RRC configuration information including a CPC command flag indicating whether a late CPC execution or not-late CPC execution is set (i.e. whether mobility robustness setting applies or not).

In S810, an RLF is detected at source PCell and UE 10 starts timer T316 for MCG Failure Recovery in S820.

In S830, the UE 10 sends the MCG failure information to the SN1 (PSCell) (e.g. gNB 30). The SN1 informs the MN1 (gNB 20) about the MCG failure information in S835. The MN1 sends in S840 a HO request to a communication network control element of the communication network (e.g. gNB 40 shown in FIG. 1) in order to initiate a handover of the UE to MN2 (a target PCell). The MN2 acknowledges the HO request in S845.

In S850, while waiting for the RRC Reconfiguration or RRC Release to be received via the source PSCell, the CPC execution condition is determined to be met by the UE 10.

In S855, the UE 10 checks the value of the flag received in S805. In case the flag indicates that the UE 10 is configured for mobility robustness/late access to the target PSCell, the UE 10 stops timer T316 and executes the CPC procedure. It is to be noted that in case timer T316 is stopped and the UE performs CPC procedure, according to examples of embodiments, the UE starts a new timer T (e.g. comparable to the example described in connection with FIG. 4) to protect the MN failure recovery procedure initiated via SN2. Otherwise, in case the check of the flag results in that the UE 10 was not configured for mobility robustness/late access to the target PSCell, the UE 10 waits for the RRC reconfiguration/RRC release information, i.e. does not perform the CPC procedure.

With regard to S860, after the UE 10 has detached from the source PSCell and accessed to a target PSCell (in the present example, this is assumed to be controlled either by gNB 30 (intra-SN CPC) or by gNB 50 (inter-SN CPC) becoming SN2, a random access procedure to SN2 is executed by UE 10 in S865.

In S883, the UE 10 sends MCG failure information to the target PSCell. It is to be noted that in the meantime, as indicated by S870 and S880, an attempt by the source PSCell to inform about the RRC reconfiguration may fail, as also the case in the example described in connection with FIG. 2.

In S885, S887 and S890, similar to a processing as described above, the SN2 informs the MN1 (gNB 20) about the MCG failure information, while the MN1 sends, in return, the RRC reconfiguration information including the handover command to the SN2. The SN2 can forward now the RRC reconfiguration information to the UE 10.

According to some examples of embodiments, it is to be noted that the MCG failure information may include an indication that the UE is configured with CPC configuration, i.e., the MN1 may not be aware of an intra-SN CPC configuration without MN involvement. Using this indication, the MN1 can be configured to store the RRC Reconfiguration/RRC Release sent in response to MCG failure recovery for later transmission in case the UE performs MCG failure recovery from target PSCell.

According to further examples of embodiments, the SN1 is configured to indicate to the MN1 that the UE 10 is configured with an intra-SN CPC configuration when forwarding the MCG failure information to the MN1, which is useful, for example, in a case when MCG failure information is received via SRB3 of the SN1.

Figure 9:
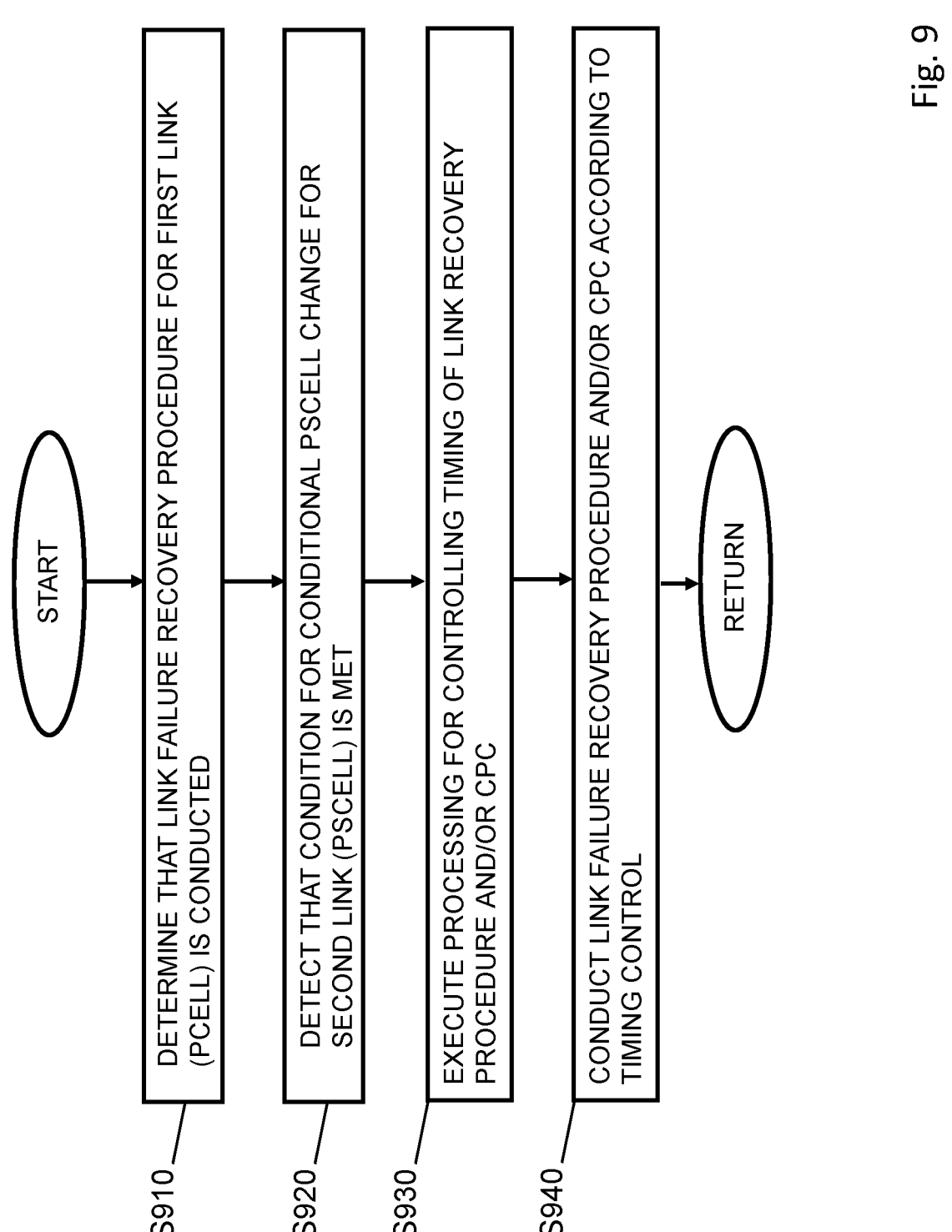
FIG. 9 shows a flow chart of a processing conducted in a communication element or function according to some examples of embodiments.

FIG. 9 shows a flow chart of a processing executed by a communication element or function, such as UE 10 as described in the examples of FIGS. 4 to 8. That is, FIG. 9 shows a flowchart related to a processing conducted by a communication element or function, such as the UE 10, configured to conduct a multi-connectivity communication in a communication network, such as a 3GPP based network, in which at least two communication links are used to at least two different cells formed by at least one network element or function for forming a communication path. For example, the multi-connectivity connection relates to a case where the first communication link is a link between the communication element or function and a primary cell (PCell) of a master cell group (MCG) established in the communication network, and the second communication link is a link between the communication element or function and a primary secondary cell (PSCell) of a secondary cell group (SCG) established in the communication network.

As also indicated above, the communication network may be based on a 3GPP standard. However, also other communication standards can be used, according to other examples of embodiments.

In S910, it is determined that a link failure recovery procedure for a first communication link with a first cell is conducted. For example, the link failure recovery procedure is a master cell group failure recovery procedure for recovering the link of the communication element or function and the primary cell of the master cell group by using a communication via the second communication link.

According to some examples of embodiments, when the link failure recovery procedure is conducted, a first timer is started which indicates a time period when a connection reestablishment procedure is started for the first communication link to the first cell.

In S920, it is detected that a condition for performing a conditional cell change procedure for the second communication link to a second cell is met, which is to be conducted during the link failure recovery procedure for the first communication link. For example, the conditional cell change procedure comprises to detach from a second cell currently used as the PSCell and to attach to a prepared new second cell to be used as the PSCell, wherein the new second cell is controlled by the same communication network control element or function as the second cell currently used as the primary secondary cell (i.e. intra-SN case), or controlled by a different communication network control element or function (i.e. inter-SN case).

In S930, a processing is executed for controlling a timing for conducting at least one of the link failure recovery procedure for the first communication link and the conditional cell change procedure for the second communication link.

According to some examples of embodiments, which are related to the example described in connection with FIG. 4, in the processing for controlling the timing for conducting at least one of the link failure recovery procedure for the first communication link and the conditional cell change procedure for the second communication link, the first timer is stopped when it is detected that the condition for performing the conditional cell change procedure for the second communication link to the second cell is met. Then, a second timer is started indicating a time period when the connection reestablishment procedure is started for the first communication link to the first cell.

According to some examples of embodiments, which are related to the example described in connection with FIG. 5, at least two different timer values for the first timer are received from a communication network control element or function controlling at least one of the first cell and the second cell (i.e. MN1 or SN1), and then processed. One of the at least two different timer values is applied for the first timer indicating the time period when the connection reestablishment procedure is started for the first communication link to the first cell. Then, in the processing for controlling the timing for conducting at least one of the link failure recovery procedure for the first communication link and the conditional cell change procedure for the second communication link, the first timer is stopped when it is detected that the condition for performing the conditional cell change procedure for the second communication link to the second cell is met. Then, the first timer is restarted, wherein another of the at least two timer values is applied for the first timer.

According to further examples of embodiments, which is similar to the case described in connection with FIG. 5, it is also possible to receive and process, from a communication network control element or function controlling at least one of the first cell and the second cell (i.e. MN1 or SN1), at least two different timer values for the first timer. In addition, it is determined whether a measurement report potentially leading to a conditional cell change procedure for the second communication link to the second cell is sent by the UE. If this is the case, a longer one of the at least two different timer values is applied for the first timer indicating the time period when the connection reestablishment procedure is started for the first communication link to the first cell. Otherwise, if no such measurement report is sent, the shorter timer value can be applied.

According to some examples of embodiments, which are related to the example described in connection with FIG. 6, a time value for the first timer and a predetermined threshold are received from a communication network control element or function controlling at least one of the first cell and the second cell (i.e. MN1 or SN1), and processed. Then, in the processing for controlling the timing for conducting at least one of the link failure recovery procedure for the first communication link and the conditional cell change procedure for the second communication link, a remaining time of the first timer is compared with the predetermined threshold. The conditional cell change procedure for the second communication link to the second cell is conducted when the remaining time is larger than the predetermined threshold. Otherwise, the conditional cell change procedure for the second communication link to the second cell is skipped when the remaining time is not larger than the predetermined threshold.

According to some examples of embodiments, which are related to the example described in connection with FIG. 7, in the processing for controlling the timing for conducting at least one of the link failure recovery procedure for the first communication link and the conditional cell change procedure for the second communication link, the first timer is stopped when it is detected that the condition for performing the conditional cell change procedure for the second communication link to the second cell is met. Then, the conditional cell change procedure for the second communication link to the second cell is skipped while a connection reestablishment procedure for the first communication link to the first cell is started.

According to some examples of embodiments, which are related to the example described in connection with FIG. 8, an indication is received, from a communication network control element or function controlling at least one of the first cell and the second cell (i.e. MN1 or SN1), whether or nota late conditional cell change procedure is set, and processed. Then, in the processing for controlling the timing for conducting at least one of the link failure recovery procedure for the first communication link and the conditional cell change procedure for the second communication link, when a late conditional cell change procedure is set, the conditional cell change procedure for the second communication link to the second cell is conducted. The first timer is stopped and a second timer is started indicating a time period when the connection reestablishment procedure is started for the first communication link to the first cell.

In S940, at least one of the link failure recovery process procedure and the conditional cell change procedure according to a result of the processing for controlling the timing is conducted.

According to some examples of embodiments, when the link failure recovery procedure for the first communication link with the first cell is conducted (see S910), an indication is sent to a communication network control element of function controlling the second cell that there is a link failure in the first communication link with the first cell, wherein the indication includes an information that a conditional cell change procedure is configured to be executable by the communication element or function.

Figure 10:
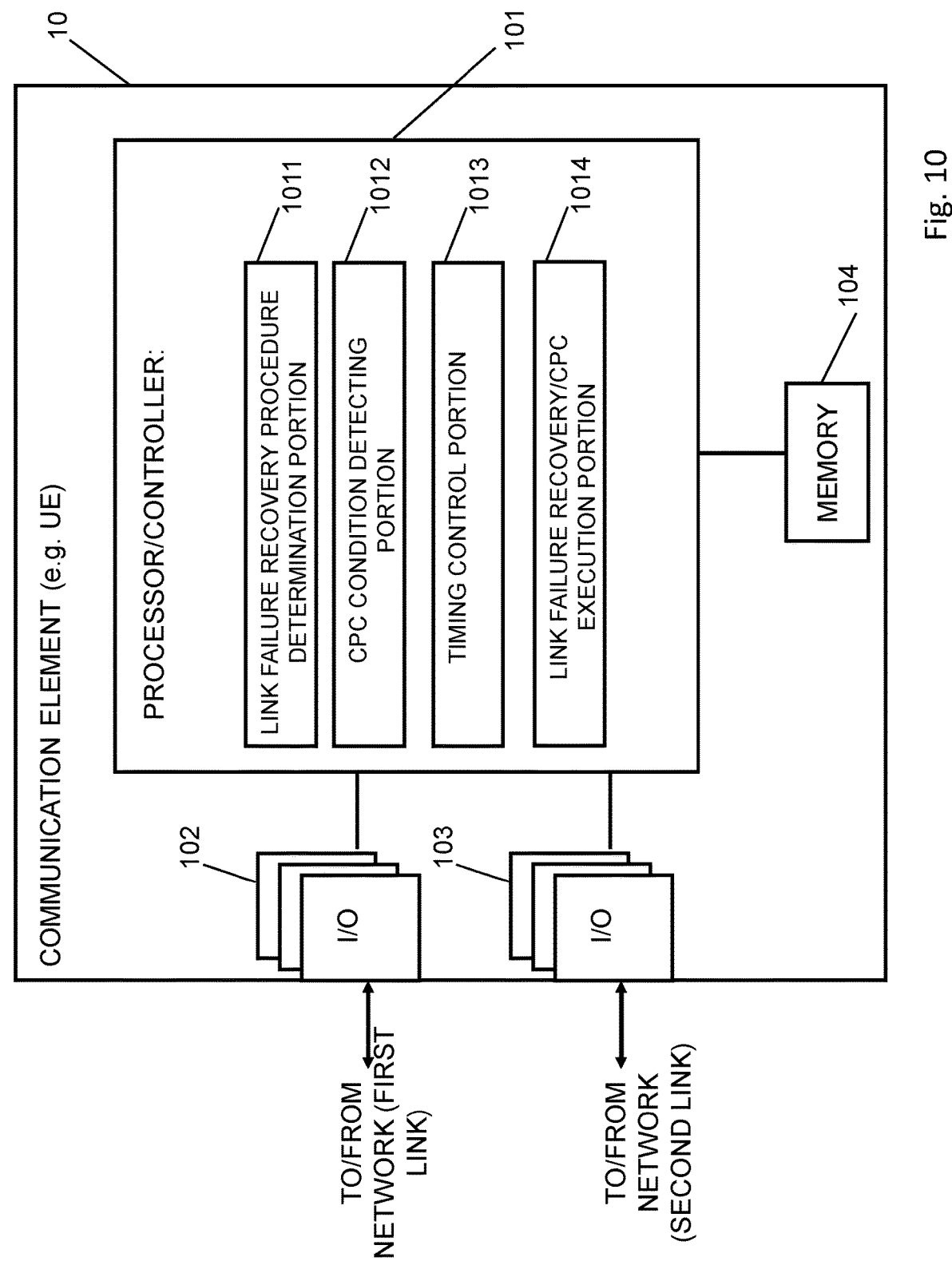
FIG. 10 shows a diagram of a network element or function representing a communication element or function according to some examples of embodiments.

FIG. 10 shows a diagram of a communication element or function, such as UE 10, according to some examples of embodiments, as described in connection with FIGS. 1 and 4 to 8, which is configured to conduct a multi-connectivity communication according to examples of embodiments of the disclosure. It is to be noted that the network element or function, like the UE 10, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication element or function 10 shown in FIG. 10 may include a processing circuitry, a processing function, a control unit or a processor 101, such as a CPU or the like, which is suitable for executing instructions given by programs or the like related to the control procedure. The processor 101 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 102 and 103 denote input/output (I/O) units or functions (interfaces) connected to the processor or processing function 101. The I/O units 102 may be used for communicating with the communication network via a first communication link (e.g. to PCell, as shown in FIG. 1, for example). The I/O units 103 may be used for communicating with the communication network via a second communication link (e.g. to PSCell, as shown in FIG. 1, for example). The I/O units 102 and 103 may be combined units including communication equipment towards several entities, or may include a distributed structure with a plurality of different interfaces for different entities. Reference sign 104 denotes a memory usable, for example, for storing data and programs to be executed by the processor or processing function 101 and/or as a working storage of the processor or processing function 101. It is to be noted that the memory 104 may be implemented by using one or more memory portions of the same or different type of memory.

The processor or processing function 101 is configured to execute processing related to the above described control processing. In particular, the processor or processing circuitry or function 101 includes one or more of the following sub-portions. Sub-portion 1011 is a processing portion which is usable as a portion for determining that a link failure recovery procedure is executed. The portion 1011 may be configured to perform processing according to S910 of FIG. 9. Furthermore, the processor or processing circuitry or function 101 may include a sub-portion 1012 usable as a portion for detecting a CPC condition being met. The portion 1012 may be configured to perform a processing according to S920 of FIG. 9. In addition, the processor or processing circuitry or function 101 may include a sub-portion 1013 usable as a portion for controlling a timing. The portion 1013 may be configured to perform a processing according to S930 of FIG. 9. Furthermore, the processor or processing circuitry or function 101 may include a sub-portion 1014 usable as a portion for executing link failure recovery and/or CPC. The portion 1014 may be configured to perform a processing according to S940 of FIG. 9.

With regard to FIG. 11, which shows a signaling diagram explaining a procedure regarding a CPC execution during an MCG failure recovery, an example of an embodiment is described which is related to the problem described in connection with FIG. 3.

As described above in connection with FIG. 3, the signaling for MCG recovery procedure via target PSCell is not efficient since specific signaling is repeated. For this purpose, according to examples of embodiments, the procedure of CPC is streamlined.

Figure 11:
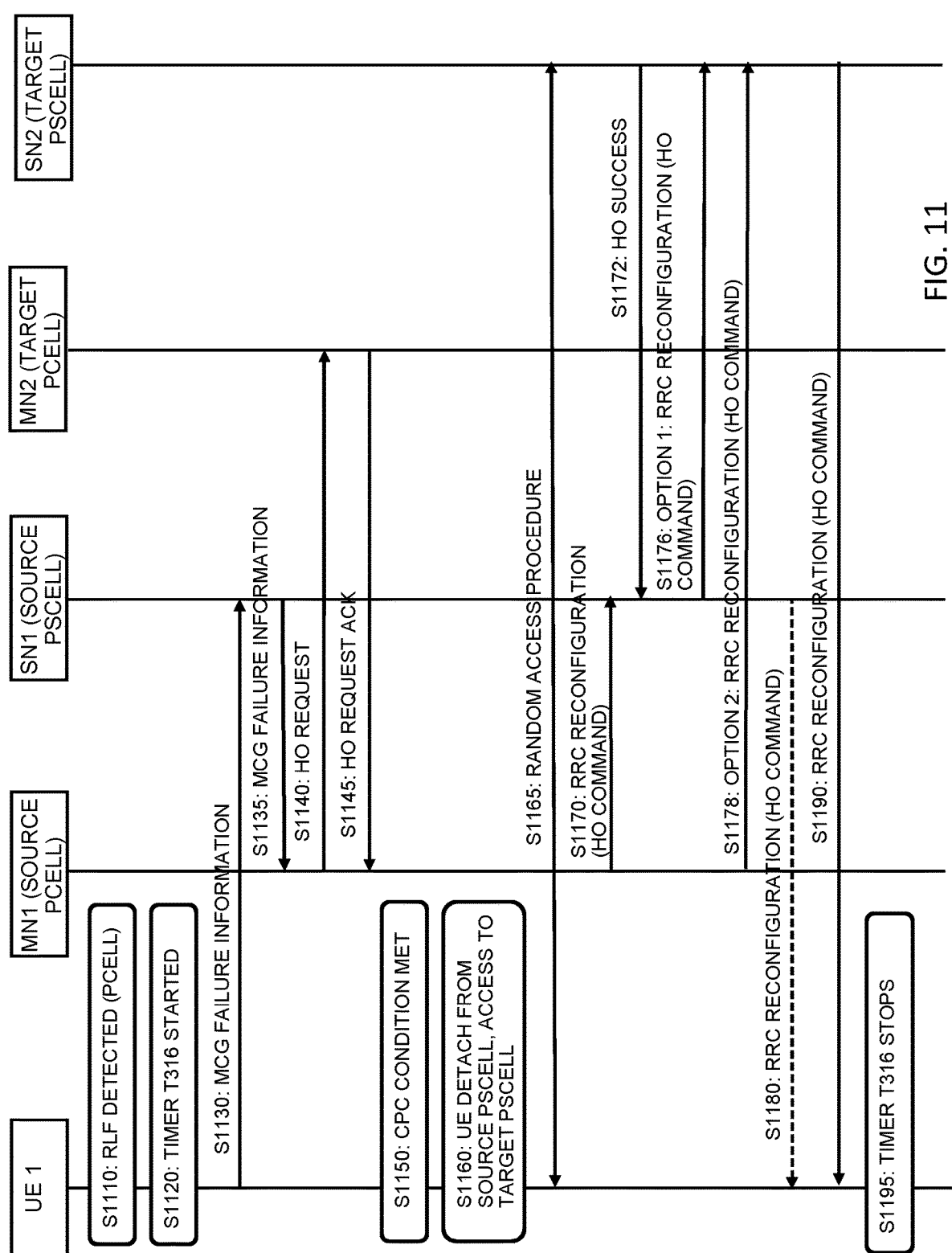
FIG. 11 shows a signaling diagram explaining a procedure regarding a CPC execution during an MCG failure recovery according to an example of an embodiment.

As shown in FIG. 11, during MCG Failure recovery procedure, the CPC execution condition is met. That is, in S1110, an RLF is detected at source PCell and UE 10 starts timer T316 for MCG Failure Recovery in S1120.

In S1130, the UE 10 sends the MCG failure information to the connected SN1 (PSCell) (e.g. gNB 30). The SN1 informs the MN1 (gNB 20) about the MCG failure information in S1135. The MN1 sends in S1140 a HO request to a communication network control element of the communication network (e.g. gNB 40 shown in FIG. 1) in order to initiate a handover of the UE to MN2 (a target PCell). The MN2 acknowledges the HO request in S1145.

In S1150, while waiting for the RRC Reconfiguration or RRC Release to be received via the source PSCell, the CPC execution condition is determined to be met by the UE 10.

In S1160 the UE 10 detaches from the source PSCell and accesses to a (new) target PSCell (in the present example, this is assumed to be controlled either by gNB 30 (intra-SN CPC) or by gNB 50 (inter-SN CPC) becoming SN2. Hence, a random access procedure to SN2 is executed by UE 10 in S1165.

In S1170, the MN1 sends the RRC reconfiguration information (including HO command) to the SN1.

In case of inter-SN CPC, the target PSCell (i.e. SN2) sends in S1172 an indication informing about the successful HO (which is adopted for CHO) to the source PSCell, i.e. SN1. "HO Success" can be sent to inform the source PSCell to stop the transmission to the UE and to start data forwarding to target PSCell, if needed.

According to some examples of embodiments, as an option 1, upon reception of the "HO Success" message from the target PSCell, the source PSCell in SN1 provides the target PSCell in SN2 in S1176 with the RRC Reconfiguration/Release if received from the MN1 (in the example of FIG. 11, this is the case in S1170). The target PSCell can then provide the RRC Reconfiguration/Release message immediately to the UE after completing the random access (S1190). Otherwise, in S1180, an attempt by the source PSCell to inform about the RRC reconfiguration fails, as also the case in the example described in connection with FIG. 2.

Alternatively, as an option 2, according to another example of embodiments, the MN1 is aware of inter-SN CPC configurations. Thus, the MN1 is configured to forward proactively the RRC Reconfiguration to the SN1 and to prepared SNs (here SN2) in S1170 and S1178. The (new) target PSCell can then provide the RRC Reconfiguration/Release message immediately to the UE after completing the random access (S1190).

The UE 10 stops the timer T316 in S1195 and performs RRC reconfiguration procedure when receiving the RRC reconfiguration or RRC release message (in S1190). Otherwise, in case timer expires, the UE performs re-establishment of the source PCell.

According to further examples of embodiments, in case of intra-SN CPC, the target PSCell being under the same SN control provides the RRC Reconfiguration/Release message to the UE 10 immediately after the UE completes the random access in S1165.

That is, in the processing as shown in FIG. 11, the target PSCell can provide the UE 10 with the RRC reconfiguration information immediately after completing the random access without fetching it from the MN1 (i.e. repeated signaling as described above is not necessary). This reduces the signaling overhead and fastens the MCG recovery With regard to FIG. 12, which shows a signaling diagram explaining a procedure regarding a CPC execution during an MCG failure recovery, another example of an embodiment is described which is related to the problem described in connection with FIG. 3, in order to streamline the procedure of CPC.

Figure 12:
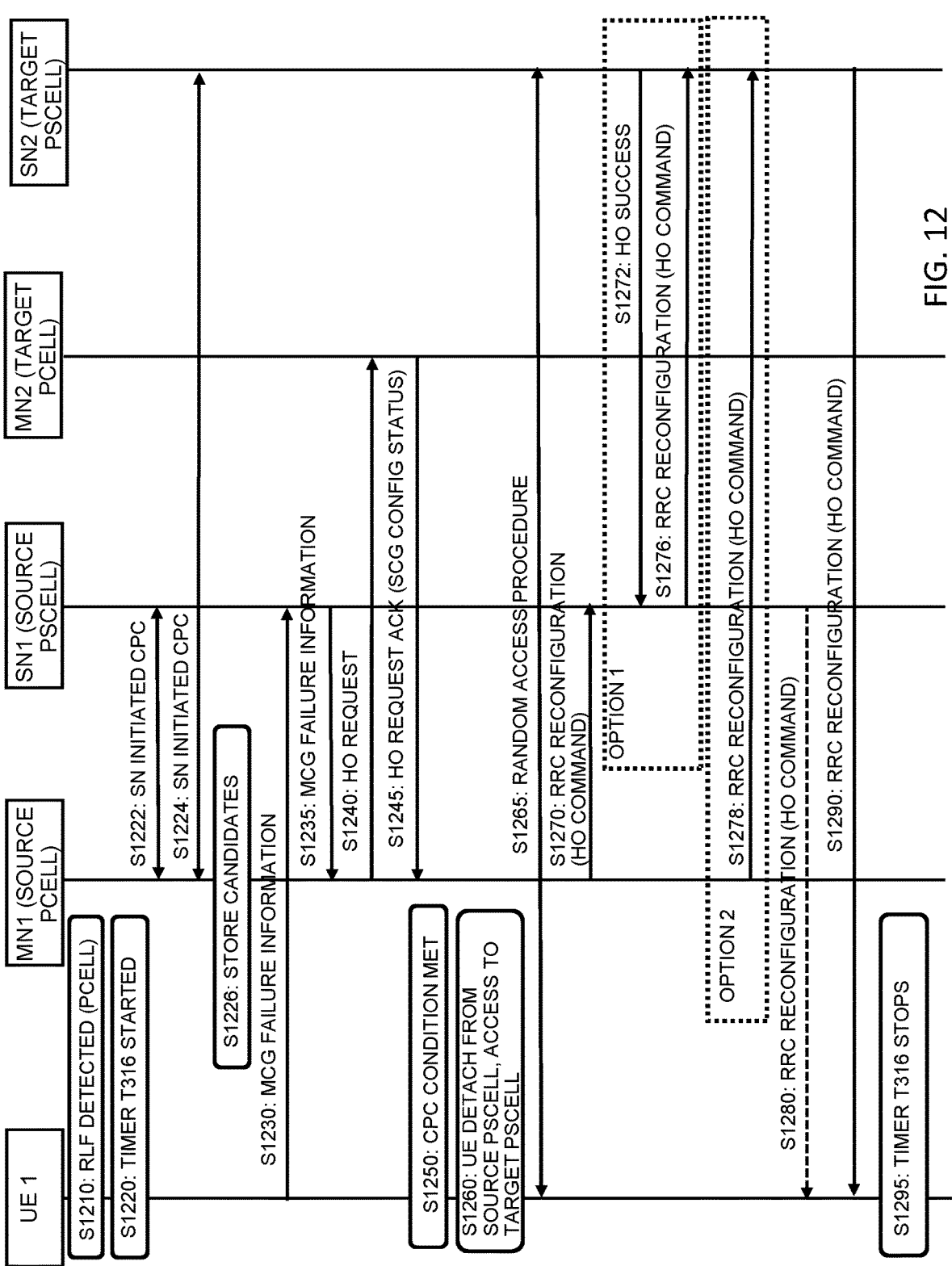
FIG. 12 shows a signaling diagram explaining a procedure regarding a CPC execution during an MCG failure recovery according to an example of an embodiment.

As shown in FIG. 12, during MCG Failure recovery procedure, the CPC execution condition is met. That is, in S1210, an RLF is detected at source PCell and UE 10 starts timer T316 for MCG Failure Recovery in S1220.

According to the present example of embodiments, it is assumed that the MN1 is involved to keep track of all potential PSCells. For this purpose, for example, in S1222 and S1224, the MN1 is informed by the cells involved in CPC (here, PSCell of SN1 and (potential PSCell of SN2 about SN initiated CPC information). In S1226, the MN1 stores corresponding information indicating the potential PSCell candidates in a memory. It is to be noted that the processing according to S1222 to S1226 may be independent from the RLF detection (i.e. start of the MCG failure recovery procedure).

In S1230, the UE 10 sends the MCG failure information to the connected SN1 (PSCell) (e.g. gNB 30). The SN1 informs the MN1 (gNB 20) about the MCG failure information in S1235. The MN1 sends in S1240 a HO request to a communication network control element of the communication network (e.g. gNB 40 shown in FIG. 1) in order to initiate a handover of the UE to MN2 (a target PCell). The MN2 acknowledges the HO request in S1245.

According to the present example of embodiments, the MN2 indicates to the MN1 whether it has configured SCG or not to cover the case where the RRC reconfiguration is received by the UE from target PSCell and this configuration provides a delta SCG configuration based on the source PSCell creating a problem at the UE. That is, the MN1 can learn from the MN2 whether MN2 has configured an SCG and/or full or delta configuration is provided for the SN in case MN2 has configured an SCG. Using this information, the MN1 is able to decide in which way the RRC reconfiguration information is to be forwarded to a prepared target PSCell (to be described below as option 2). For example, in order to avoid that the changed PSCell creates a possible problem for the received RRC reconfiguration sent by the MN1, the MN1 may send RRC reconfiguration information containing either 1) only an MCG configuration without SCG or 2) MCG with full SN configuration. In both cases, the change of the source PSCell does not influence the aspect that the received RRC reconfiguration containing an SCG is prepared with the source PSCell. That is, the MN1 may decide whether it sends proactively RRC reconfiguration information received from the MN2 to the prepared target PSCells or not, e.g. for example when RRC reconfiguration contains no SCG or SCG with full configuration.

In order to ensure to avoid the complexity of MN decoding the configuration received from MN2, the MN2 may indicate to MN1 whether it has configured SCG or not. This is achieved, according to the present example, by adding a corresponding flag SCG_config_status in the message sent in S1245.

In S1250, while waiting for the RRC Reconfiguration or RRC Release to be received via the source PSCell, the CPC execution condition is determined to be met by the UE 10.

In S1260 the UE 10 detaches from the source PSCell and accesses to a (new) target PSCell (in the present example, this is assumed to be controlled either by gNB 30 (intra-SN CPC) or by gNB 50 (inter-SN CPC) becoming SN2. Hence, a random access procedure to SN2 is executed by UE 10 in S1265.

In S1270, the MN1 sends the RRC reconfiguration information (including HO Command) to the SN1.

In case of inter-SN CPC, the target PSCell (i.e. SN2) sends in S1272 an indication informing about the successful HO (which is adopted for CHO) to the source PSCell, i.e. SN1. "HO Success" can be sent to inform the source PSCell to stop the transmission to the UE and to start data forwarding to target PSCell, if needed.

According to some examples of embodiments, as an option 1, upon reception of the "HO Success" message from the target PSCell, the source PSCell in SN1 provides the target PSCell in SN2 in S1276 with the RRC Reconfiguration/Release if received from the MN1 (in the example of FIG. 12, this is the case in S1270). The target PSCell can then provide the RRC Reconfiguration/Release message immediately to the UE after completing the random access (S1290).

Alternatively, as an option 2, according to another example of embodiments, the MN1 is aware of inter-SN CPC configurations. Thus, the MN1 is configured to forward the RRC Reconfiguration to the SN1 and to prepared SNs (here SN2) in S1270 and S1278, according to the information stored in S1226, for example. The target PSCell can then provide the RRC Reconfiguration/Release message immediately to the UE after completing the random access (S1190).

In both options 1 and 2 as described above, the MN1 is configured to prepare the RRC reconfiguration information in accordance with the value of the SCG config status flag received in S1245, for example.

The UE 10 stops the timer T316 in S1295 and performs RRC reconfiguration procedure when receiving the RRC reconfiguration or RRC release message (in S1290). Otherwise, in case timer expires, the UE performs re-establishment of the source PCell.

Thus, as described above in connection with FIG. 12, the target PSCell can provide the UE 10 with the RRC reconfiguration information immediately after completing the random access. This reduces the signaling overhead and fastens the MCG recovery.

Figure 13:
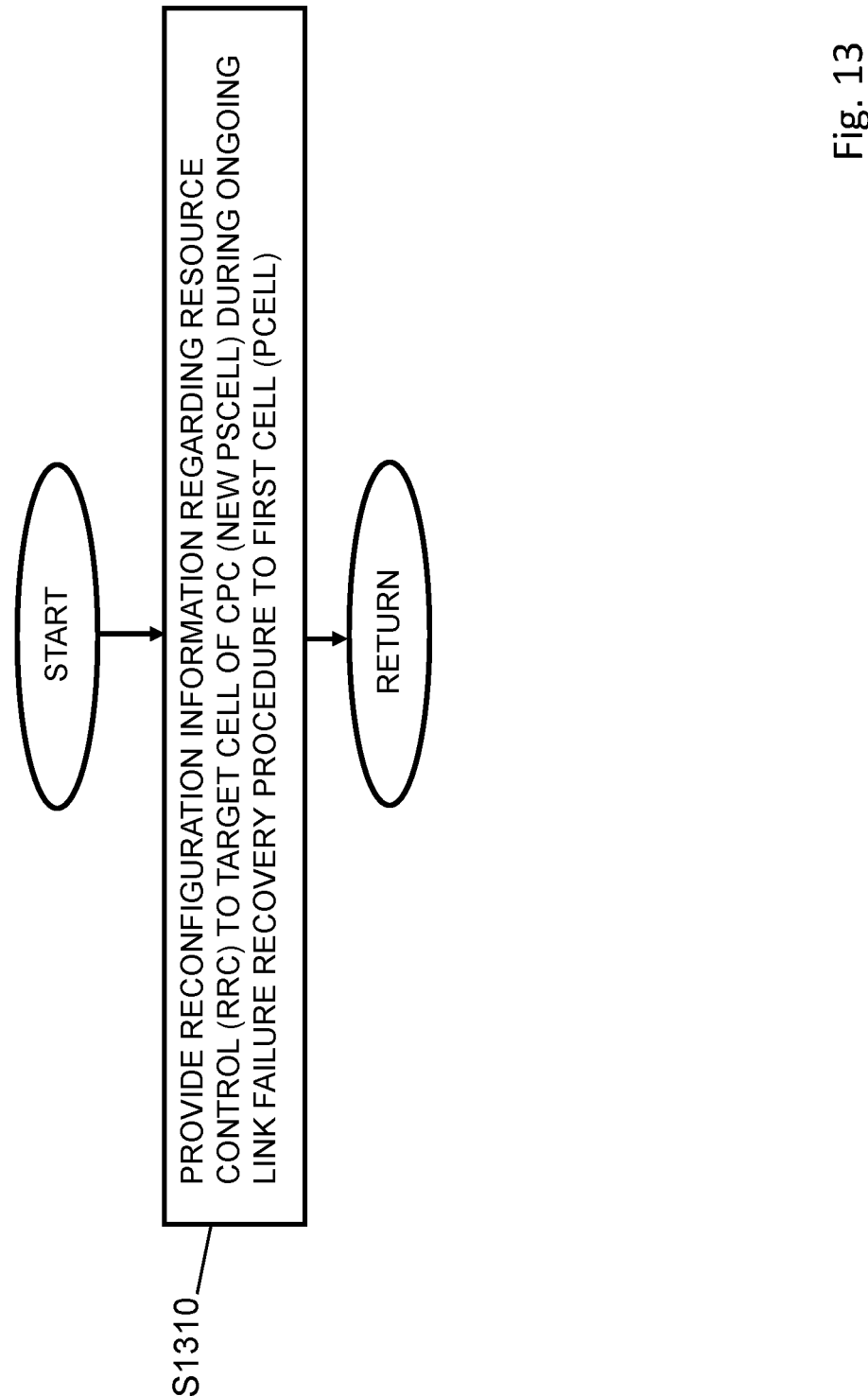
FIG. 13 shows a flow chart of a processing conducted in a communication network control element or function according to some examples of embodiments.

FIG. 13 shows a flow chart of a processing executed by a communication network control element or function, such as gNB1 20 acting as MN1 or gNB2 30 acting as SN1, as described in the examples of FIGS. 11 and 12. That is, FIG. 13 shows a flowchart related to a processing conducted by a communication network control element or function, such as the gNB1 20 or the gNB 30, which controls a multi-connectivity communication of a communication element or function in a communication network, such as a 3GPP based network, in which at least two communication links are used to at least two different cells at least one of which being controlled by the communication network control element or function for forming a communication path. For example, the multi-connectivity connection relates to a case where the first communication link is a link between the communication element or function and a primary cell (PCell) of a master cell group (MCG) established in the communication network, and the second communication link is a link between the communication element or function and a primary secondary cell (PSCell) of a secondary cell group (SCG) established in the communication network.

As also indicated above, the communication network may be based on a 3GPP standard. However, also other communication standards can be used, according to other examples of embodiments.

In 1310, when a link failure recovery procedure for a first communication link with a first cell is conducted and, during the link failure recovery procedure, a conditional cell change procedure for a second communication link to a second cell is conducted, reconfiguration information regarding resource control for the first communication link is provided to a communication network control element or function controlling a target cell in the conditional cell change procedure for the second communication link to a second cell. The target cell may be controlled by the same communication network control element or function like the current second cell, or by a different communication network control element or function.

According to examples of embodiments, the link failure recovery procedure is a master cell group failure recovery procedure for recovering the link of the communication element or function and the primary cell of a master cell group by using a communication via the second communication link.

Furthermore, according to examples of embodiments, the conditional cell change procedure comprises to detach from a second cell currently used as the primary secondary cell and to attach to a prepared new second cell to be used as the primary secondary cell, wherein the new second cell is controlled by the same communication network control element or function as the second cell currently used as the primary secondary cell (i.e. intra-SN case), or controlled by a different communication network control element or function (i.e. inter-SN case).

According to some examples of embodiments, the communication network control element or function involved in the processing of FIG. 13 controls the second cell with which a communication path is formed when the link failure recovery procedure for the first communication link is started (i.e. SN1). The reconfiguration information is provided when an indication of a successful conditional cell change is received from the target cell.

Alternatively, according to some examples of embodiments, the communication network control element or function involved in the processing of FIG. 13 controls the first cell with which a communication path is formed when the link failure recovery procedure for the first communication link is started (i.e. MN1).

According to some examples of embodiments, information indicating candidate cells for a conditional cell change for the second communication link to a second cell are stored. The reconfiguration information regarding resource control for the first communication link is then provided to each communication network control element or function controlling the candidate cells indicated in the stored information.

Furthermore, according to some examples of embodiments, information indicating whether the reconfiguration information regarding resource control for the first communication link has a secondary cell group configuration or not is received from a communication control element or function being involved in the link failure recovery procedure of the first link (e.g. from MN2), and processed. The received information is used for deciding on whether to provide the reconfiguration information regarding resource control for the first communication link to a communication network control element or function controlling a target cell in the conditional cell change procedure for the second communication link to a second cell (i.e. to SN2), or not. That is, the MN2 may indicate to the MN1 whether it has configured SCG or not, e.g. by sending SCG_config_status (see also FIG. 12).

Figure 14:
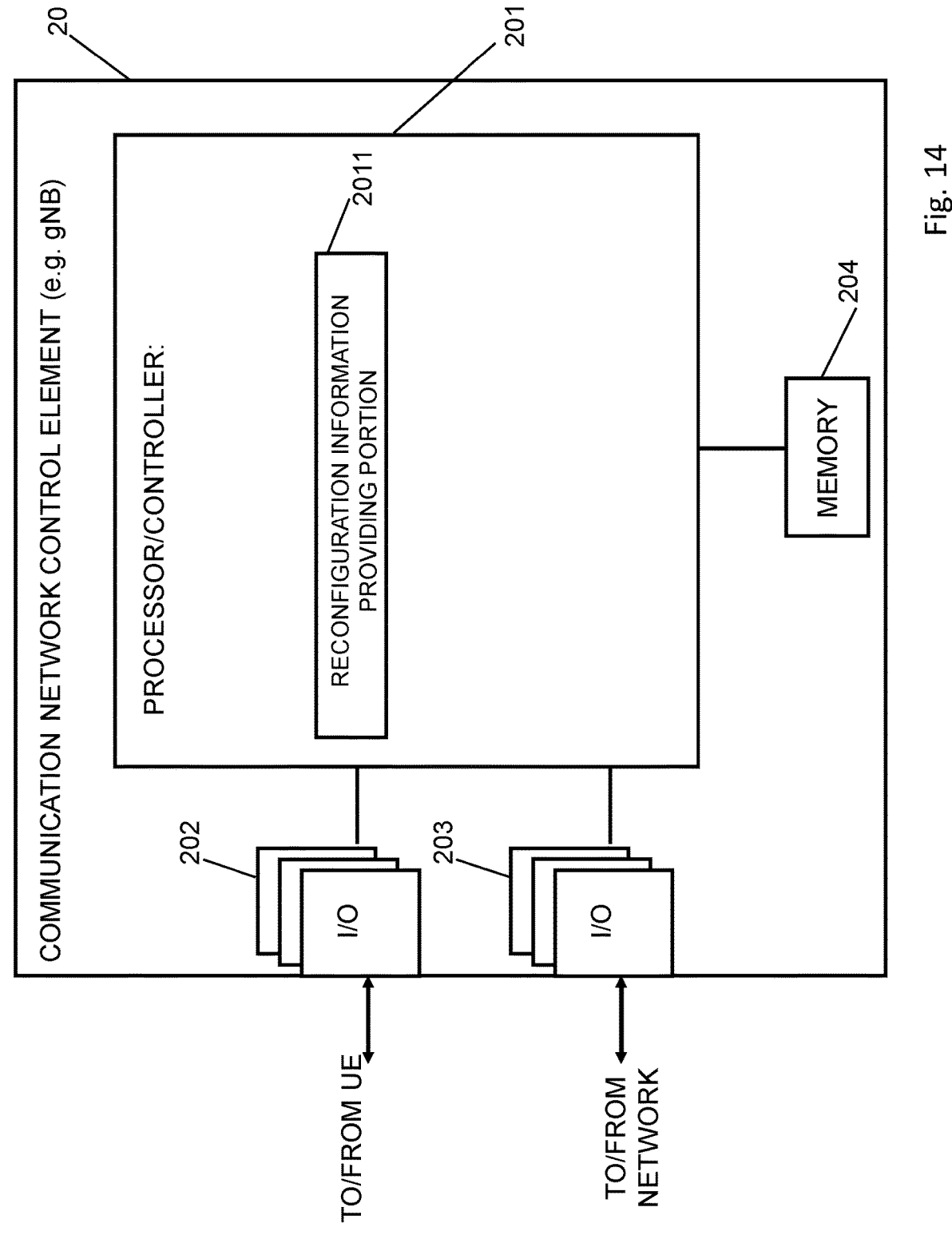
FIG. 14 shows a diagram of a network element or function representing a communication network control element or function according to some examples of embodiments.

FIG. 14 shows a diagram of a communication network control element or function acting as a control element of function, such as gNB1 20 or gNB2 30 according to some examples of embodiments, as described in connection with FIGS. 11 and 12, which is configured to conduct a control of a multi-connectivity communication of a communication element or function in a communication network according to examples of embodiments of the disclosure. It is to be noted that the network element or function, like the gNB may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element or function 20 shown in FIG. 14 may include a processing circuitry, a processing function, a control unit or a processor 201, such as a CPU or the like, which is suitable for executing instructions given by programs or the like related to the control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 and 203 denote input/output (I/O) units or functions (interfaces) connected to the processor or processing function 201. The I/O units 202 may be used for communicating with a communication element or function, such as UE 10. The I/O units 203 may be used for communicating with network parts located on the communication network (e.g. other gNBs, the core network etc.). The I/O units 202 and 203 may be combined units including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described control processing. In particular, the processor or processing circuitry or function 201 includes at least the following subportion 2011 which is a processing portion which is usable as a portion for providing reconfiguration information. The portion 2011 may be configured to perform processing according to S1310 of FIG. 13.

In the examples of embodiments described above, different concepts for dealing with issues in connection with an execution of a cell change procedure, such as a CPC procedure, for a secondary cell link during an ongoing link failure recovery procedure for a primary cell link have been described wherein as one approach measures are described where the UE performs a timing control with regard to CPC and or MCG failure recovery (in connection with FIGS. 4 to 9, for example), while as another approach measure are described in which the CPC execution is made more efficient in terms of signaling and delay (in connection with FIGS. 11 to 13, for example). According to further examples of embodiments, it is also possible to combine these measures. In particular, in cases where the timing control results in an execution of the CPC, as discussed for example in connection with FIGS. 4, 5, 6 and 8, the possibility of repeated signaling during the CPC execution can be dealt with by considering measures according to the examples described in connection with FIGS. 11 and 12, for example, in order to improve the efficiency of the signaling in CPC procedure.

As described above, by means of the measures discussed in the examples of embodiments, it is possible to provide solutions that can ensure that the UE has enough time to complete CPC and recover PCell via target PSCell. Furthermore, it is possible that an early termination of timer (e.g. T316) is allowed when it is deemed by the UE that waiting for RRC Reconfiguration or RRC Release from the source PSCell is not beneficial/or most likely won't be successful. Furthermore, it is possible to provide an improved procedure for reducing signaling overhead and delay when recovering the MCG from target PSCell. In addition, improved robustness and shorter UE interruption time can be achieved.

It is to be noted that examples of embodiments of the disclosure are applicable to various different network configurations. In other words, the examples shown in the above described figures, which are used as a basis for the above discussed examples, are only illustrative and do not limit the present disclosure in any way. That is, additional further existing and proposed new functionalities available in a corresponding operating environment may be used in connection with examples of embodiments of the disclosure based on the principles defined.

According to a further example of embodiments, there is provided, for example, an apparatus for use by a communication element or function configured to conduct a multi-connectivity communication in a communication network in which at least two communication links are used to at least two different cells formed by at least one network element or function for forming a communication path, the apparatus comprising means configured to determine that a link failure recovery procedure for a first communication link with a first cell is conducted, means configured to detect that a condition for performing a conditional cell change procedure for a second communication link to a second cell is met, which is to be conducted during the link failure recovery procedure for the first communication link, means configured to execute a processing for controlling a timing for conducting at least one of the link failure recovery procedure for the first communication link and the conditional cell change procedure for the second communication link, and means configured to conduct at least one of the link failure recovery process procedure and the conditional cell change procedure according to a result of the processing for controlling the timing.

Furthermore, according to some other examples of embodiments, the above defined apparatus may further comprise means for conducting at least one of the processing defined in the above described methods, for example a method according to that described in connection with FIG. 9.

According to a further example of embodiments, there is provided, for example, an apparatus for use by a communication network control element or function configured to control a multi-connectivity communication of a communication element or function in a communication network in which at least two communication links are used to at least two different cells at least one of which being controlled by the communication network control element or function for forming a communication path, the apparatus comprising means configured to provide, when a link failure recovery procedure for a first communication link with a first cell is conducted and, during the link failure recovery procedure, a conditional cell change procedure for a second communication link to a second cell is conducted, reconfiguration information regarding resource control for the first communication link to a communication network control element or function controlling a target cell in the conditional cell change procedure for the second communication link to a second cell.

Furthermore, according to some other examples of embodiments, the above defined apparatus may further comprise means for conducting at least one of the processing defined in the above described methods, for example a method according to that described in connection with FIG. 13.

According to a further example of embodiments, there is provided, for example, a non-transitory computer readable medium comprising program instructions for causing an apparatus to perform, when conducting a multi-connectivity communication in a communication network in which at least two communication links are used to at least two different cells formed by at least one network element or function for forming a communication path, at least the following processing: determining that a link failure recovery procedure for a first communication link with a first cell is conducted, detecting that a condition for performing a conditional cell change procedure for a second communication link to a second cell is met, which is to be conducted during the link failure recovery procedure for the first communication link, executing a processing for controlling a timing for conducting at least one of the link failure recovery procedure for the first communication link and the conditional cell change procedure for the second communication link, and conducting at least one of the link failure recovery process procedure and the conditional cell change procedure according to a result of the processing for controlling the timing.

According to a further example of embodiments, there is provided, for example, a non-transitory computer readable medium comprising program instructions for causing an apparatus to perform, when conducting to control a multi-connectivity communication of a communication element or function in a communication network in which at least two communication links are used to at least two different cells at least one of which being controlled by the communication network control element or function for forming a communication path, at least the following processing: providing, when a link failure recovery procedure for a first communication link with a first cell is conducted and, during the link failure recovery procedure, a conditional cell change procedure for a second communication link to a second cell is conducted, reconfiguration information regarding resource control for the first communication link to a communication network control element or function controlling a target cell in the conditional cell change procedure for the second communication link to a second cell.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. An apparatus for use by a communication element or function configured to conduct a multi-connectivity communication in a communication network in which at least two communication links are used to at least two different cells formed by at least one network element or function for forming a communication path, the apparatus comprising at least one processing circuitry, and at least one memory for storing instructions to be executed by the processing circuitry, wherein the at least one memory and the instructions are configured to, with the at least one processing circuitry, cause the apparatus at least:

to determine that a link failure recovery procedure for a first communication link with a first cell is conducted, to detect that a condition for performing a conditional cell change procedure for a second communication link to a second cell is met, which is to be conducted during the link failure recovery procedure for the first communication link, to execute a processing for controlling a timing for conducting at least one of the link failure recovery procedure for the first communication link and the conditional cell change procedure for the second communication link, and to conduct at least one of the link failure recovery process procedure and the conditional cell change procedure according to a result of the processing for controlling the timing, wherein the at least one memory and the instructions are further configured to, with the at least one processing circuitry, cause the apparatus at least:

to start, when the link failure recovery procedure is conducted, a first timer indicating a time period when a connection reestablishment procedure is started for the first communication link to the first cell, wherein the at least one memory and the instructions are further configured to, with the at least one processing circuitry, cause the apparatus at least:

in the processing for controlling the timing for conducting at least one of the link failure recovery procedure for the first communication link and the conditional cell change procedure for the second communication link, to stop the first timer when it is detected that the condition for performing the conditional cell change procedure for the second communication link is met, and to start a second timer indicating a time period when the connection reestablishment procedure is started for the first communication link to the first cell.

2. The apparatus according to claim 1, wherein the at least one memory and the instructions are further configured to, with the at least one processing circuitry, cause the apparatus at least:

to receive and process, from a communication network control element or function controlling at least one of the first cell and the second cell, at least two different timer values for the first timer, wherein one of the at least two different timer values is applied for the first timer indicating the time period when the connection reestablishment procedure is started for the first communication link to the first cell, and, in the processing for controlling the timing for conducting at least one of the link failure recovery procedure for the first communication link and the conditional cell change procedure for the second communication link, to stop the first timer when it is detected that the condition for performing the conditional cell change procedure for the second communication link to the second cell is met, and to restart the first timer, wherein another of the at least two timer values is applied for the first timer.

3. The apparatus according to claim 1, wherein the at least one memory and the instructions are further configured to, with the at least one processing circuitry, cause the apparatus at least:

to receive and process, from a communication network control element or function controlling at least one of the first cell and the second cell, at least two different timer values for the first timer, to determine whether a measurement report potentially leading to a conditional cell change procedure for the second communication link to the second cell is sent, and in case the measurement report is sent, to apply a longer one of the at least two different timer values for the first timer indicating the time period when the connection reestablishment procedure is started for the first communication link to the first cell.

4. The apparatus according to claim 1, wherein the at least one memory and the instructions are further configured to, with the at least one processing circuitry, cause the apparatus at least:

to receive and process, from a communication network control element or function controlling at least one of the first cell and the second cell, a time value for the first timer and a predetermined threshold, and, in the processing for controlling the timing for conducting at least one of the link failure recovery procedure for the first communication link and the conditional cell change procedure for the second communication link, to compare a remaining time of the first timer with the predetermined threshold, to conduct the conditional cell change procedure for the second communication link to the second cell when the remaining time is larger than the predetermined threshold, and to skip the conditional cell change procedure for the second communication link to the second cell when the remaining time is not larger than the predetermined threshold.

5. The apparatus according to claim 1, wherein the at least one memory and the instructions are further configured to, with the at least one processing circuitry, cause the apparatus at least:

in the processing for controlling the timing for conducting at least one of the link failure recovery procedure for the first communication link and the conditional cell change procedure for the second communication link, to stop the first timer when it is detected that the condition for performing the conditional cell change procedure for the second communication link to the second cell is met, to skip the conditional cell change procedure for the second communication link to the second cell and to start the connection reestablishment procedure for the first communication link to the first cell.

6. The apparatus according to claim 1, wherein the at least one memory and the instructions are further configured to, with the at least one processing circuitry, cause the apparatus at least:

to receive and process, from a communication network control element or function controlling at least one of the first cell and the second cell, an indication whether or not a late conditional cell change procedure is set, and, in the processing for controlling the timing for conducting at least one of the link failure recovery procedure for the first communication link and the conditional cell change procedure for the second communication link, when a late conditional cell change procedure is set, to conduct the conditional cell change procedure for the second communication link to the second cell, to stop the first timer and to start a second timer indicating a time period when the connection reestablishment procedure is started for the first communication link to the first cell.

7. The apparatus according to claim 1, wherein the at least one memory and the instructions are further configured to, with the at least one processing circuitry, cause the apparatus at least:

to send, when the link failure recovery procedure for the first communication link with the first cell is conducted, an indication to a communication network control element of function controlling the second cell that there is a link failure in the first communication link with the first cell, wherein the indication includes an information that a conditional cell change procedure is configured to be executable by the communication element or function.

8. The apparatus according to claim 1, wherein the first communication link is a link between the communication element or function and a primary cell of a master cell group established in the communication network, and the second communication link is a link between the communication element or function and a primary secondary cell of a secondary cell group established in the communication network.

9. The apparatus according to claim 8, wherein the link failure recovery procedure is a master cell group failure recovery procedure for recovering the link of the communication element or function and the primary cell of a master cell group by using a communication via the second communication link.

10. A method for use in a communication element or function configured to conduct a multi-connectivity communication in a communication network in which at least two communication links are used to at least two different cells formed by at least one network element or function for forming a communication path, the method comprising determining that a link failure recovery procedure for a first communication link with a first cell is conducted, detecting that a condition for performing a conditional cell change procedure for a second communication link to a second cell is met, which is to be conducted during the link failure recovery procedure for the first communication link, executing a processing for controlling a timing for conducting at least one of the link failure recovery procedure for the first communication link and the conditional cell change procedure for the second communication link, and conducting at least one of the link failure recovery process procedure and the conditional cell change procedure according to a result of the processing for controlling the timing, the method further comprising, starting, when the link failure recovery procedure is conducted, a first timer indicating a time period when a connection reestablishment procedure is started for the first communication link to the first cell; and in the processing for controlling the timing for conducting at least one of the link failure recovery procedure for the first communication link and the conditional cell change procedure for the second communication link, stopping the first timer when it is detected that the condition for performing the conditional cell change procedure for the second communication link to the second cell is met, and starting a second timer indicating a time period when the connection reestablishment procedure is started for the first communication link to the first cell.

11. The method according to claim 10, further comprising receiving and processing, from a communication network control element or function controlling at least one of the first cell and the second cell, a time value for the first timer and a predetermined threshold, and, in the processing for controlling the timing for conducting at least one of the link failure recovery procedure for the first communication link and the conditional cell change procedure for the second communication link, comparing a remaining time of the first timer with the predetermined threshold, conducting the conditional cell change procedure for the second communication link to the second cell when the remaining time is larger than the predetermined threshold, and skipping the conditional cell change procedure for the second communication link to the second cell when the remaining time is not larger than the predetermined threshold.

12. The method according to claim 10, further comprising sending, when the link failure recovery procedure for the first communication link with the first cell is conducted, an indication to a communication network control element of function controlling the second cell that there is a link failure in the first communication link with the first cell, wherein the indication includes an information that a conditional cell change procedure is configured to be executable by the communication element or function.

13. The method according to claim 10, wherein the first communication link is a link between the communication element or function and a primary cell of a master cell group established in the communication network, and the second communication link is a link between the communication element or function and a primary secondary cell of a secondary cell group established in the communication network.

14. An apparatus for use by a communication element or function configured to conduct a multi-connectivity communication in a communication network in which at least two communication links are used to at least two different cells formed by at least one network element or function for forming a communication path, the apparatus comprising at least one processing circuitry, and at least one memory for storing instructions to be executed by the processing circuitry, wherein the at least one memory and the instructions are configured to, with the at least one processing circuitry, cause the apparatus at least:

to determine that a link failure recovery procedure for a first communication link with a first cell is conducted, to detect that a condition for performing a conditional cell change procedure for a second communication link to a second cell is met, which is to be conducted during the link failure recovery procedure for the first communication link, to execute a processing for controlling a timing for conducting at least one of the link failure recovery procedure for the first communication link and the conditional cell change procedure for the second communication link, and to conduct at least one of the link failure recovery process procedure and the conditional cell change procedure according to a result of the processing for controlling the timing, to start, when the link failure recovery procedure is conducted, a first timer indicating a time period when a connection reestablishment procedure is started for the first communication link to the first cell, to receive and process, from a communication network control element or function controlling at least one of the first cell and the second cell, at least two different timer values for the first timer, wherein one of the at least two different timer values is applied for the first timer indicating the time period when the connection reestablishment procedure is started for the first communication link to the first cell, and, in the processing for controlling the timing for conducting at least one of the link failure recovery procedure for the first communication link and the conditional cell change procedure for the second communication link, to stop the first timer when it is detected that the condition for performing the conditional cell change procedure for the second communication link to the second cell is met, and to restart the first timer, wherein another of the at least two timer values is applied for the first timer.

* * * * *